United States Patent
Ström et al.

(10) Patent No.: US 8,824,790 B2
(45) Date of Patent: *Sep. 2, 2014

(54) PREDICTION-BASED IMAGE PROCESSING

(75) Inventors: Jacob Ström, Stockholm (SE); Per Wennersten, Arsta (SE); Tomas Akenine-Moller, Lund (SE); Jim Rasmusson, Vellinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,127

(22) Filed: Sep. 14, 2012

(65) Prior Publication Data

US 2013/0011059 A1    Jan. 10, 2013

Related U.S. Application Data

(63) Continuation of application No. 12/863,214, filed as application No. PCT/EP2008/056288 on May 21, 2008, now Pat. No. 8,331,664.

(60) Provisional application No. 61/022,397, filed on Jan. 21, 2008.

(30) Foreign Application Priority Data

May 6, 2008  (EP) .................. PCT/EP2008/055520

(51) Int. Cl.
G06K 9/36    (2006.01)
G06K 9/46    (2006.01)

(52) U.S. Cl.
USPC ........... 382/166; 382/232; 382/233; 382/238; 382/250

(58) Field of Classification Search
USPC .................................. 382/166, 232, 233, 238
See application file for complete search history.

(56) References Cited

U.S. PATENT DOCUMENTS

| 6,014,463 | A | * | 1/2000 | Hirabayashi | .................. 382/232 |
| 8,331,664 | B2 | * | 12/2012 | Strom et al. | .................. 382/166 |
| 2006/0215921 | A1 | * | 9/2006 | Yokose et al. | ................. 382/238 |
| 2007/0211797 | A1 | * | 9/2007 | Kim et al. | ................ 375/240.12 |
| 2008/0019597 | A1 | * | 1/2008 | Song | ............................ 382/233 |

OTHER PUBLICATIONS

Symes "Video Compression-fundamental Compression Techniques and an Overview of the JPEG and MPEG Compression Systems." McGraw-Hill, 1998, Section 4-2-1 "Predicting Image Values" pp. 68-72.*

* cited by examiner

Primary Examiner — Tom Y Lu
Assistant Examiner — Weiwen Yang
(74) Attorney, Agent, or Firm — Coats and Bennett, P.L.L.C.

(57) ABSTRACT

A pixel block is compressed by providing a respective color component prediction for each pixel in the block. A difference between color components of two neighboring pixels is calculated and compared to a threshold. If the difference is smaller than the threshold, the prediction is calculated based on a first linear combination of the color components of these two neighboring pixels. However, if the difference exceeds the threshold, a second or third linear combination of the color components of the neighboring pixels is employed in the prediction. A guiding bit associated with the selected linear combination may be used. A prediction error is calculated based on the color component of the pixel and the provided prediction. The compressed block comprises an encoded representation of the prediction error and any guiding bit.

15 Claims, 13 Drawing Sheets

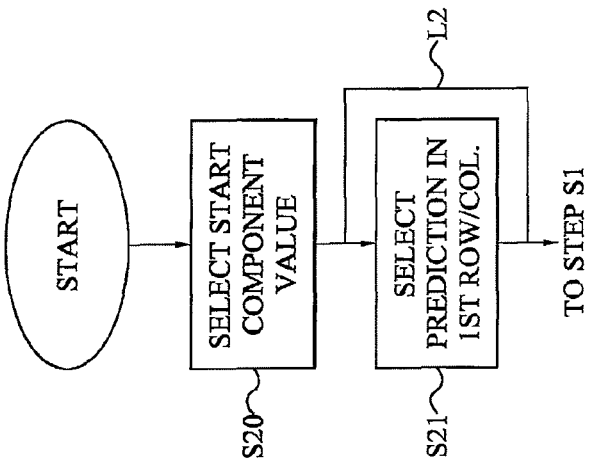
Fig. 5
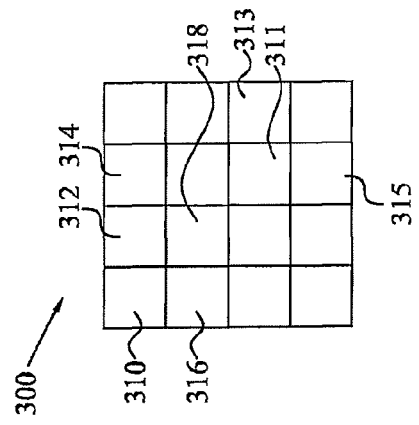
Fig. 2
Fig. 4
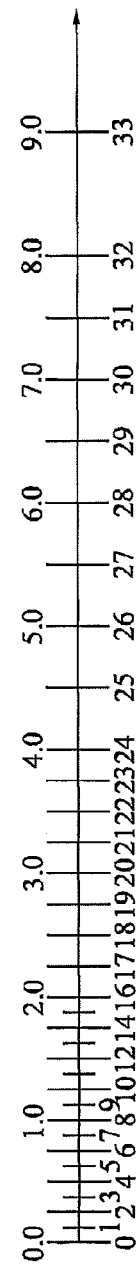
Fig. 3

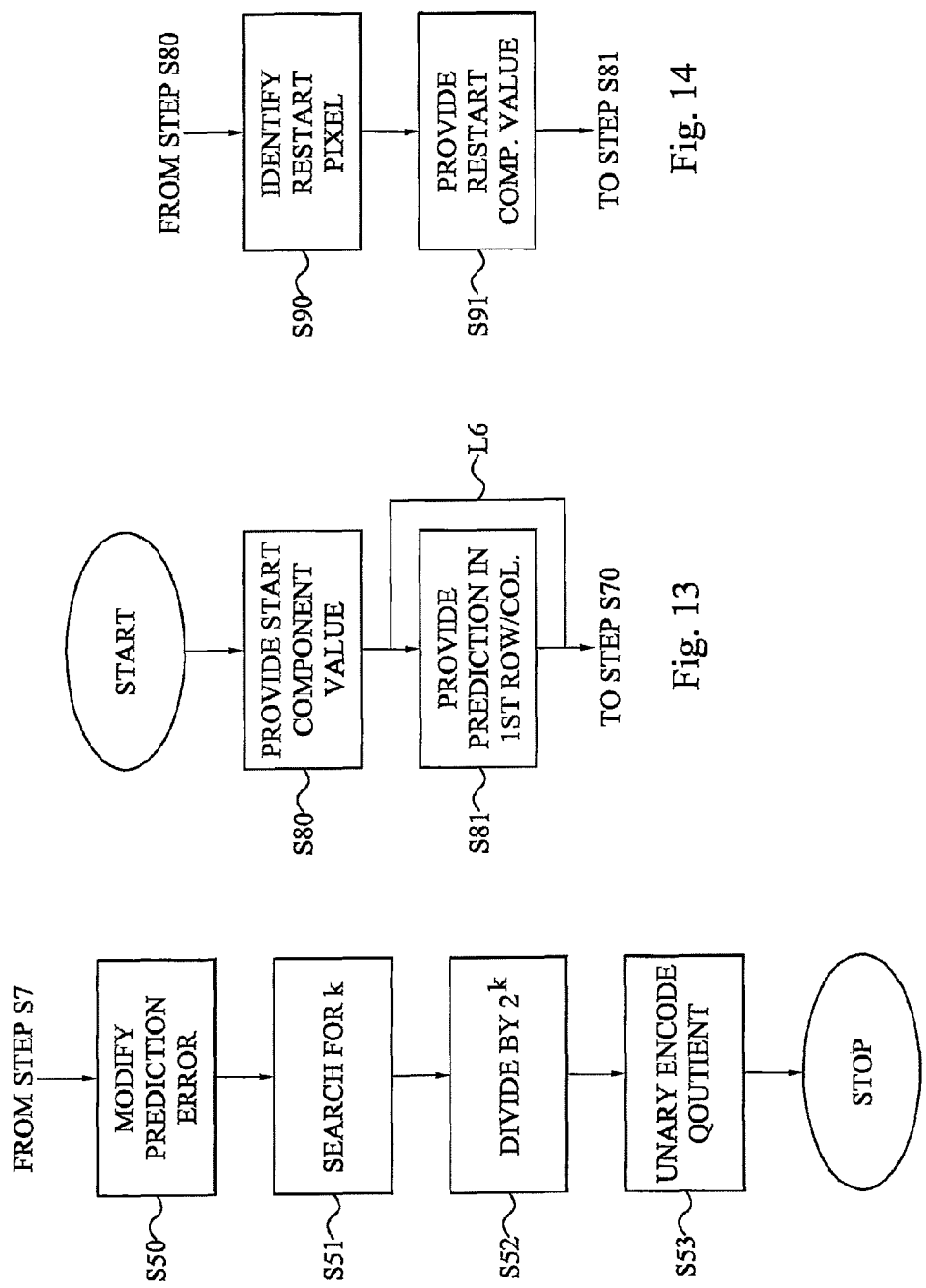

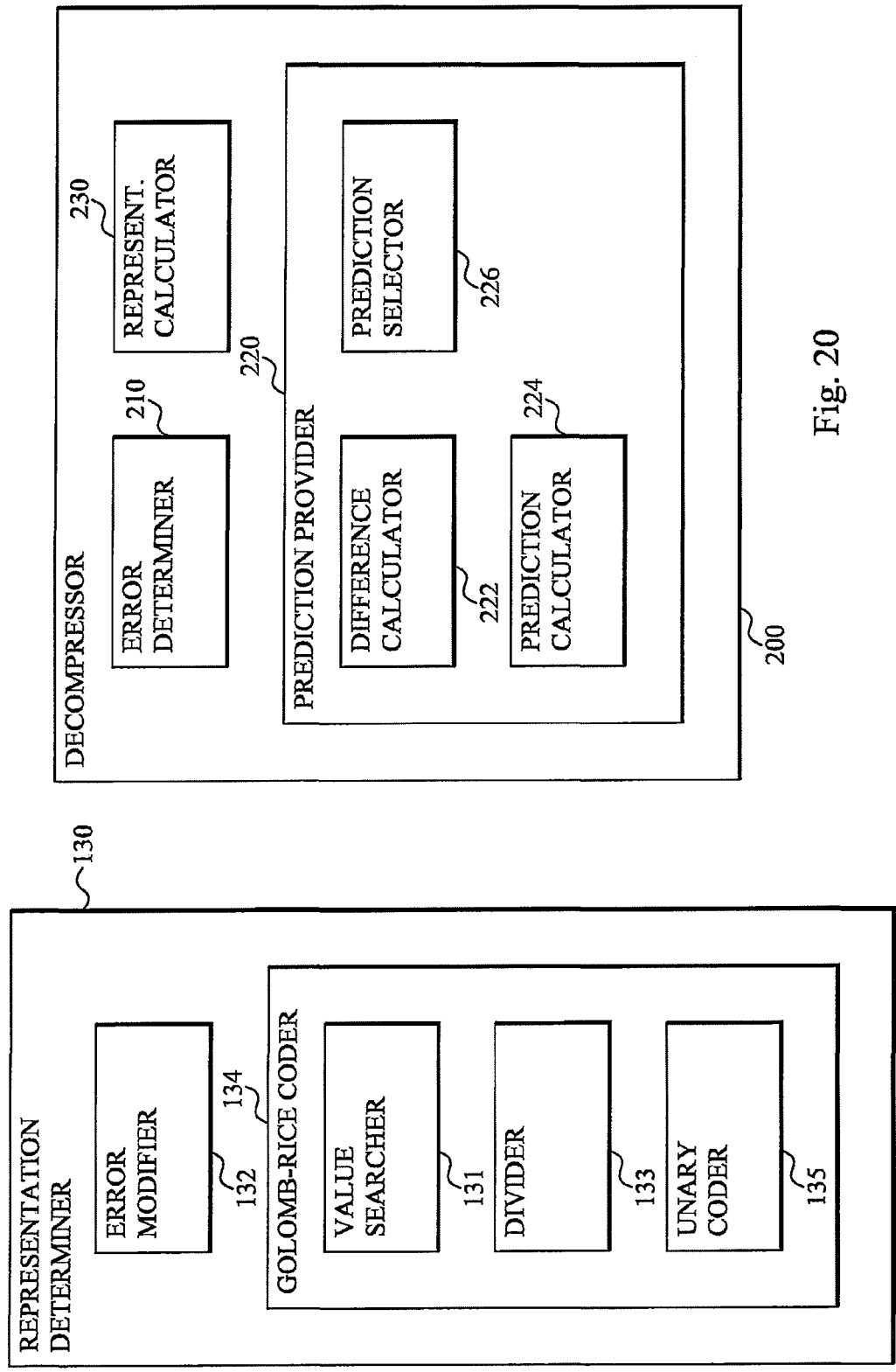

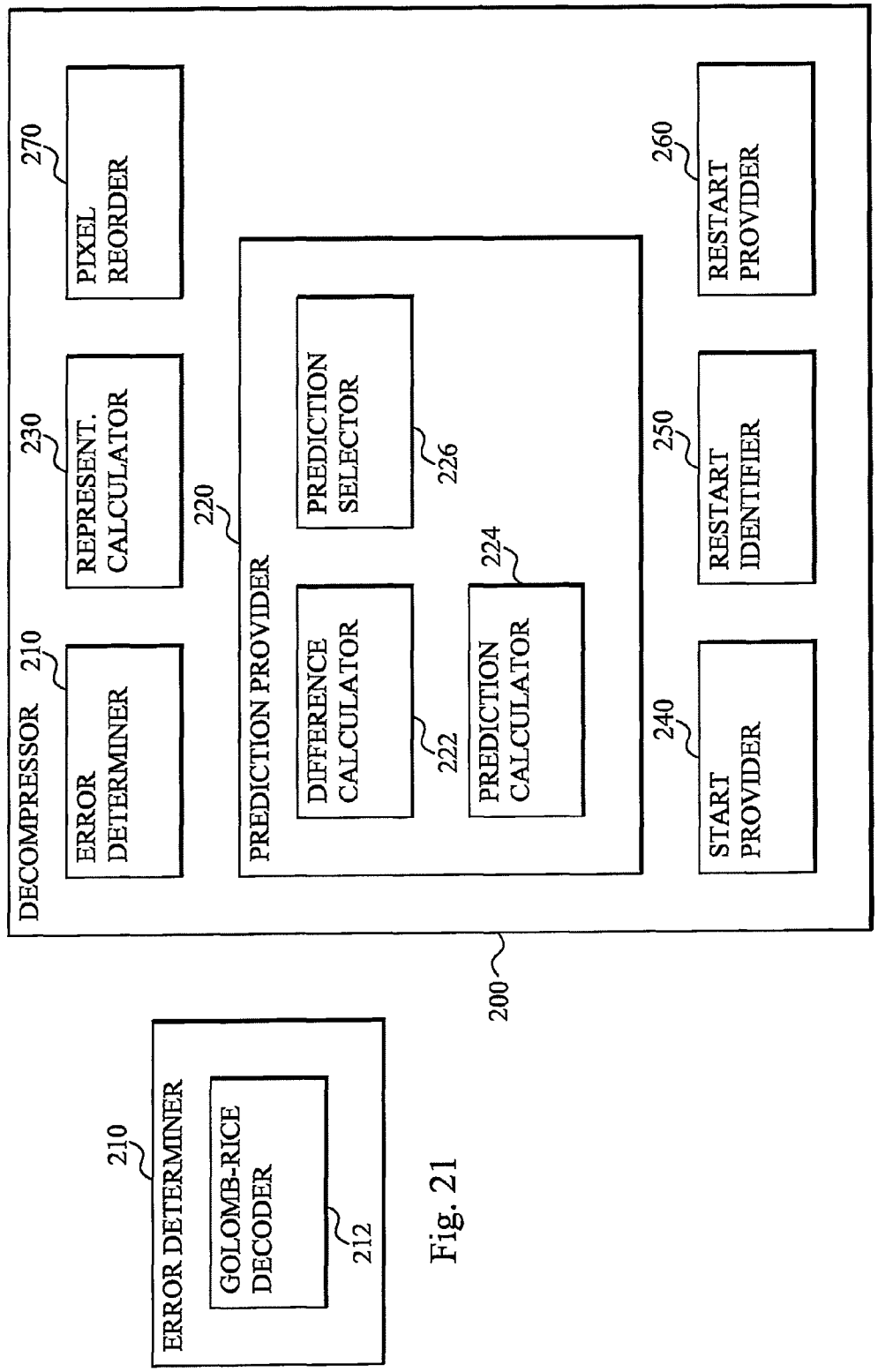

PREDICTION-BASED IMAGE PROCESSING

CROSS-REFERENCE TO RELATED APPLICATIONS

This application is a continuation of U.S. application Ser. No. 12/863,214 filed on Jul. 21, 2010, which is the US national application of PCT Application PCT/EP2008/056288, which claims benefits of U.S. Provisional Application 61/022,397 filed on Jan. 21, 2008 and benefits of PCT Application PCT/EP2008/055520 filed on May 6, 2008.

TECHNICAL FIELD

The present invention generally relates to image processing, and in particular to prediction-based compression and decompression of image blocks.

BACKGROUND

In order to increase performance for graphics processing units (GPUs), memory bandwidth reduction techniques are employed. One such way to decrease the bandwidth requirements is to perform what is called buffer compression. A graphics system typically uses two buffers: a color buffer where the colors of the pixels are drawn and a depth buffer where the depth of each pixel is stored. During rendering these buffers are read and written to and often the same pixel is accessed several times for both buffers. These read and write accesses are expensive in terms of energy and should therefore be kept to a minimum, in particular for user terminals with limited power supply, such as mobile devices.

Buffer compression implies that blocks of buffer data is stored in memory in compressed form. Since the decompression and compression might happen several times for a particular pixel and block, it is important that the compression is lossless, i.e. non-destructive.

Documents [1] and [2] give good overviews of prior art buffer compression and depth buffer compression, respectively.

Color buffer data leads to an important problem as compared to depth buffer data as it may involve sharp edges between the drawn triangle and the background. Traditional color buffer data techniques may run into problems when having a prediction-based color buffer compression by predicting over the edge of such discontinuities.

SUMMARY

The present invention overcomes these and other drawbacks of the prior art arrangements.

It is a general object of the present invention to provide an efficient color buffer compression and decompression.

This and other objects are met by the invention as defined by the accompanying patent claims.

Briefly, the present invention involves compression and decompression of blocks of pixels having associated colors. The compression involves providing a prediction of a color component of at least one pixel in the block. This prediction is provided by first calculating a difference between the color components of two neighboring pixels in the block, preferably positioned on the same row or column in the block as the current pixel. If the magnitude of this difference exceeds a predefined threshold, the color component prediction is calculated based on a first weighted combination of the color components of the two neighboring pixels, preferably based on an average of the two color components. However, if the magnitude difference is not smaller than the threshold, there is a selection between a second and a third weighted combination of the color components of the two neighboring pixel. Furthermore, a guiding bit associated with the selected weighted combination or prediction direction is assigned to the pixel. The first weighted combination uses non-zero weights while at least one of the second and third combination can have one of its two respective weights equal to zero. Furthermore, the three weighted combinations all use different weights for the two color components.

A prediction error is calculated for the pixel based on its color component and the provided color component prediction. The generated compressed block comprises an encoded representation of this calculated prediction error plus the guiding bit if determined for the current pixel.

Decompression of the compressed block involves determination of a prediction error for a pixel to decode. This prediction error is determined based on the encoded error representation associated with the pixel and included in the compressed block. A prediction of the color component of the pixel is then provided. In similarity to the compression, a difference between the color components of two previously decoded neighboring pixels is determined. If the magnitude difference is smaller than the threshold, the color component prediction is calculated based on the first weighted combination of the color components of the two neighboring pixels. However, in case the magnitude difference exceeds the threshold, a guiding bit assigned to the pixel and included in the compressed block is employed in the prediction provision. The guiding bit dictates which of the second and third weighted combination of the color components of the two neighboring pixels to select as prediction for the current pixel.

The color component of the pixel is obtained from the determined error prediction and the provided color component prediction.

The present invention also relates to a compressor and decompressor.

The present invention can handle pixel blocks having unnaturally sharp color discontinuities between different pixel positions. As a consequence, the invention avoids doing prediction across such discontinuity edges.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 2 is an illustration of an example of a pixel block useful in the present invention;

Figure 1:
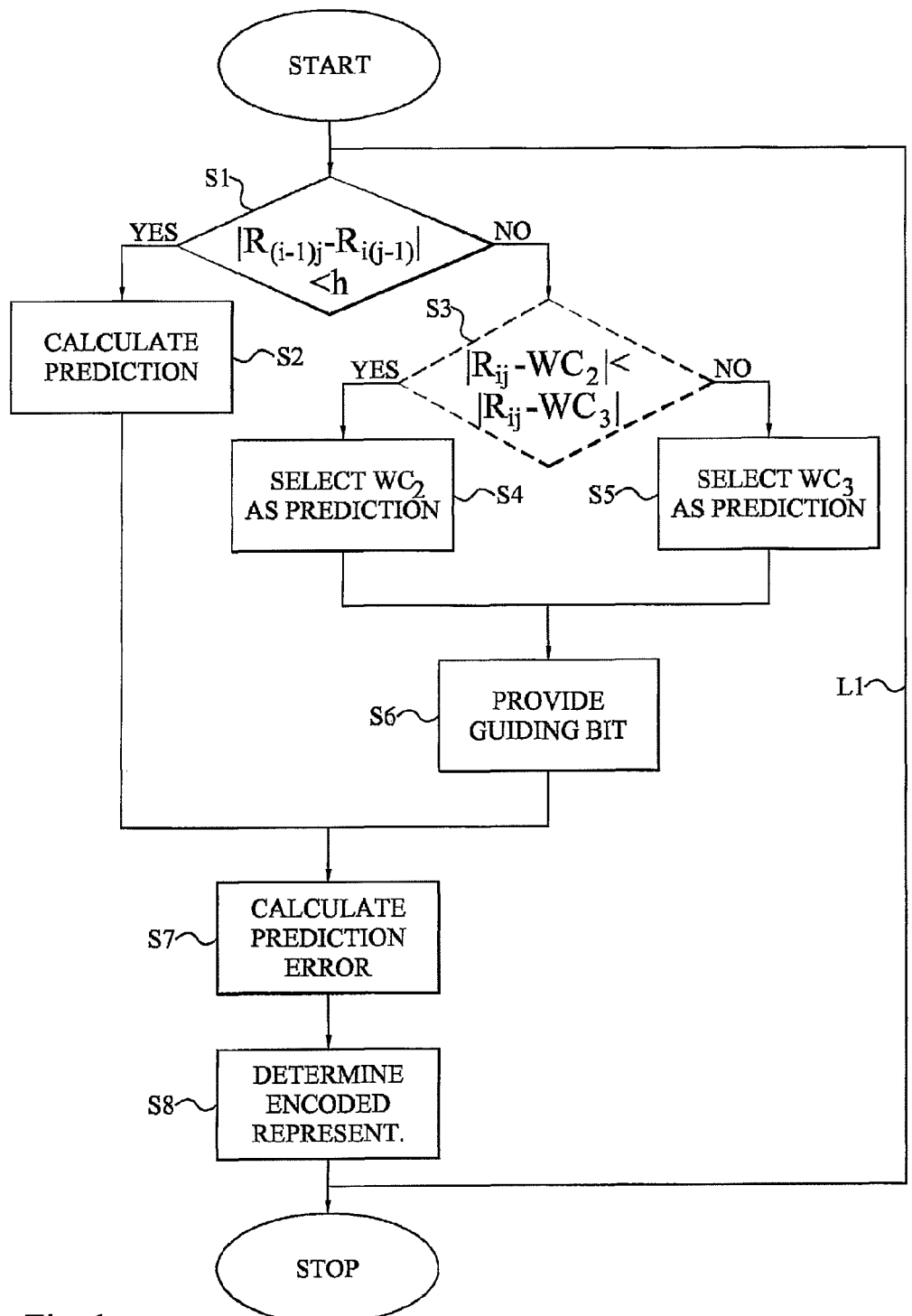
FIG. 1 is a flow diagram of an embodiment of a block compressing method according to the present invention.
Figure 6:
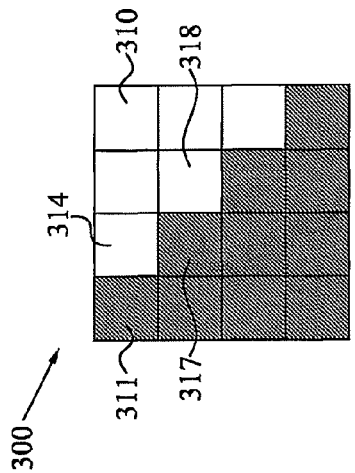
Figure 7:
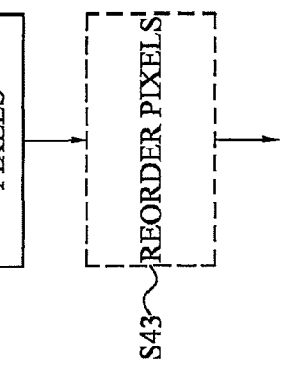
Figure 8A:
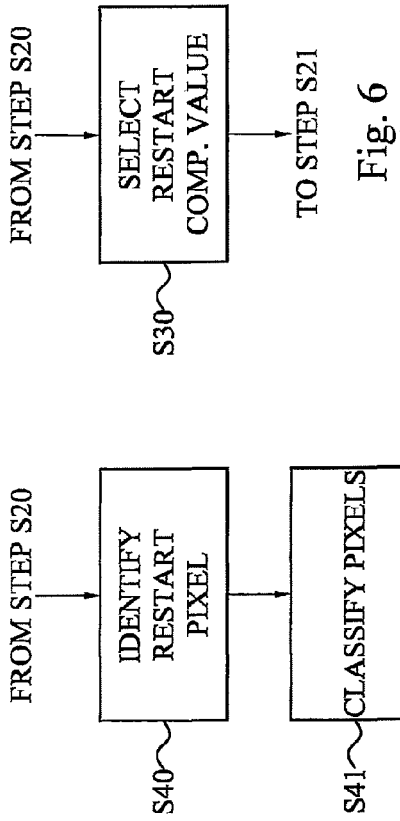
Figure 8B:
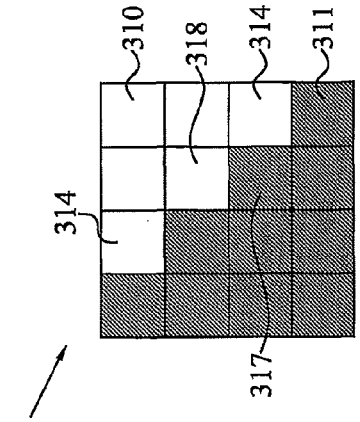
Figure 8C:
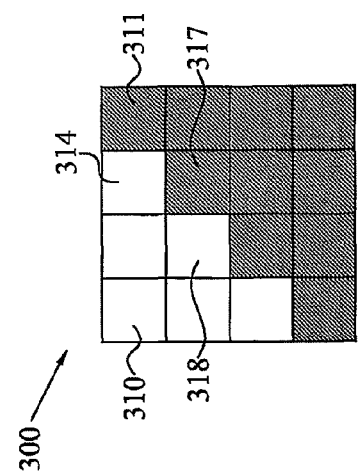
Figure 10:
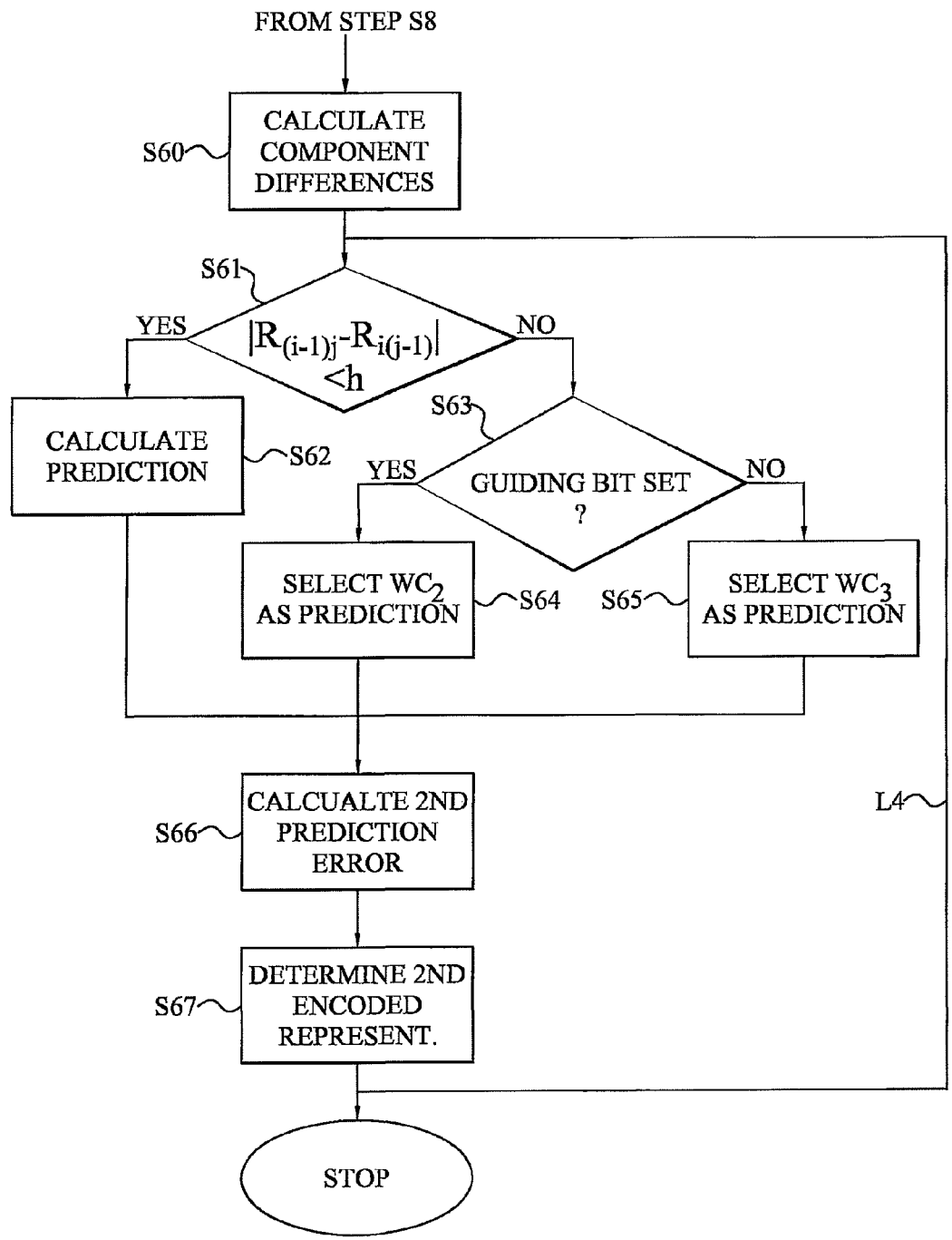
Figure 11:
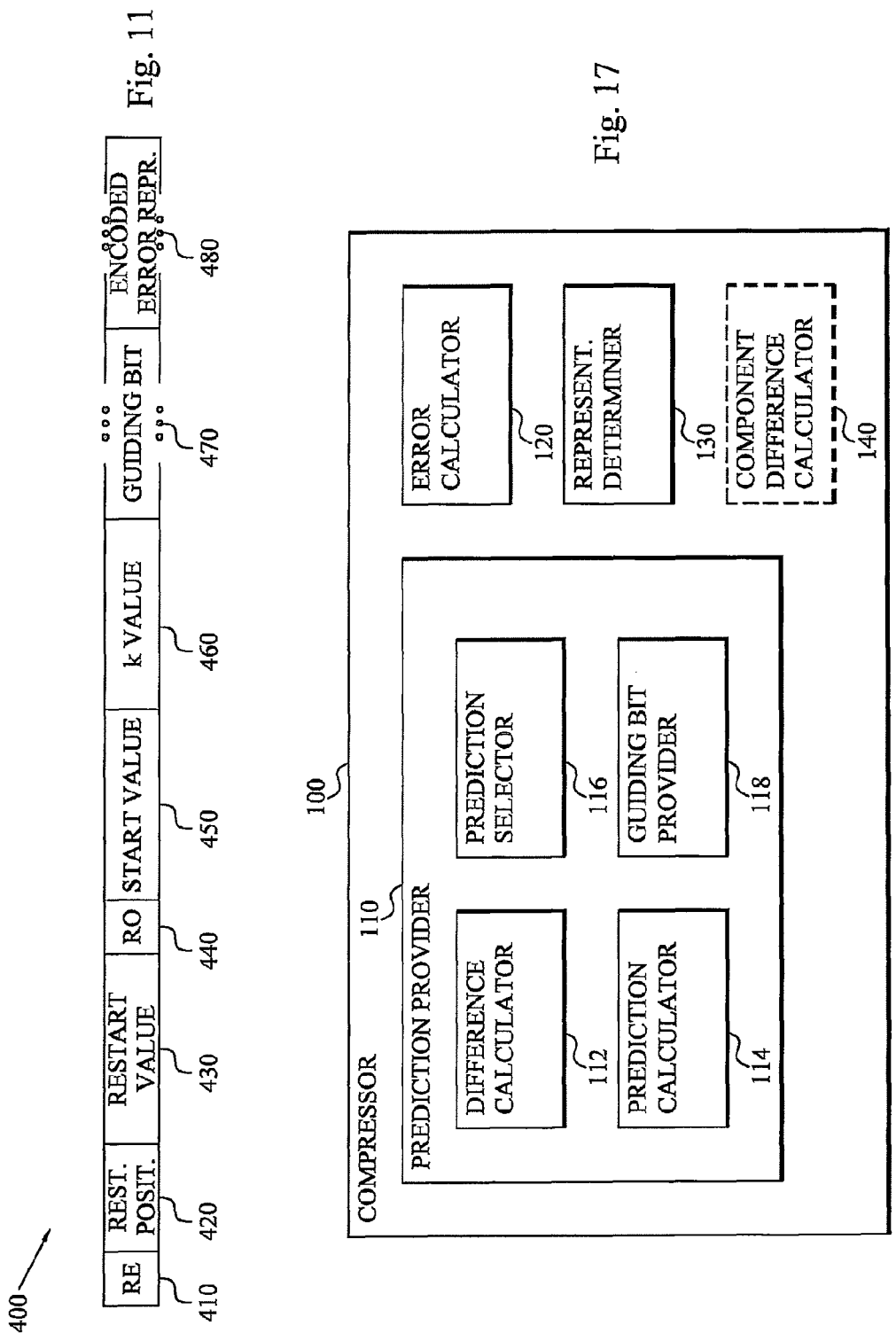
Figure 12:
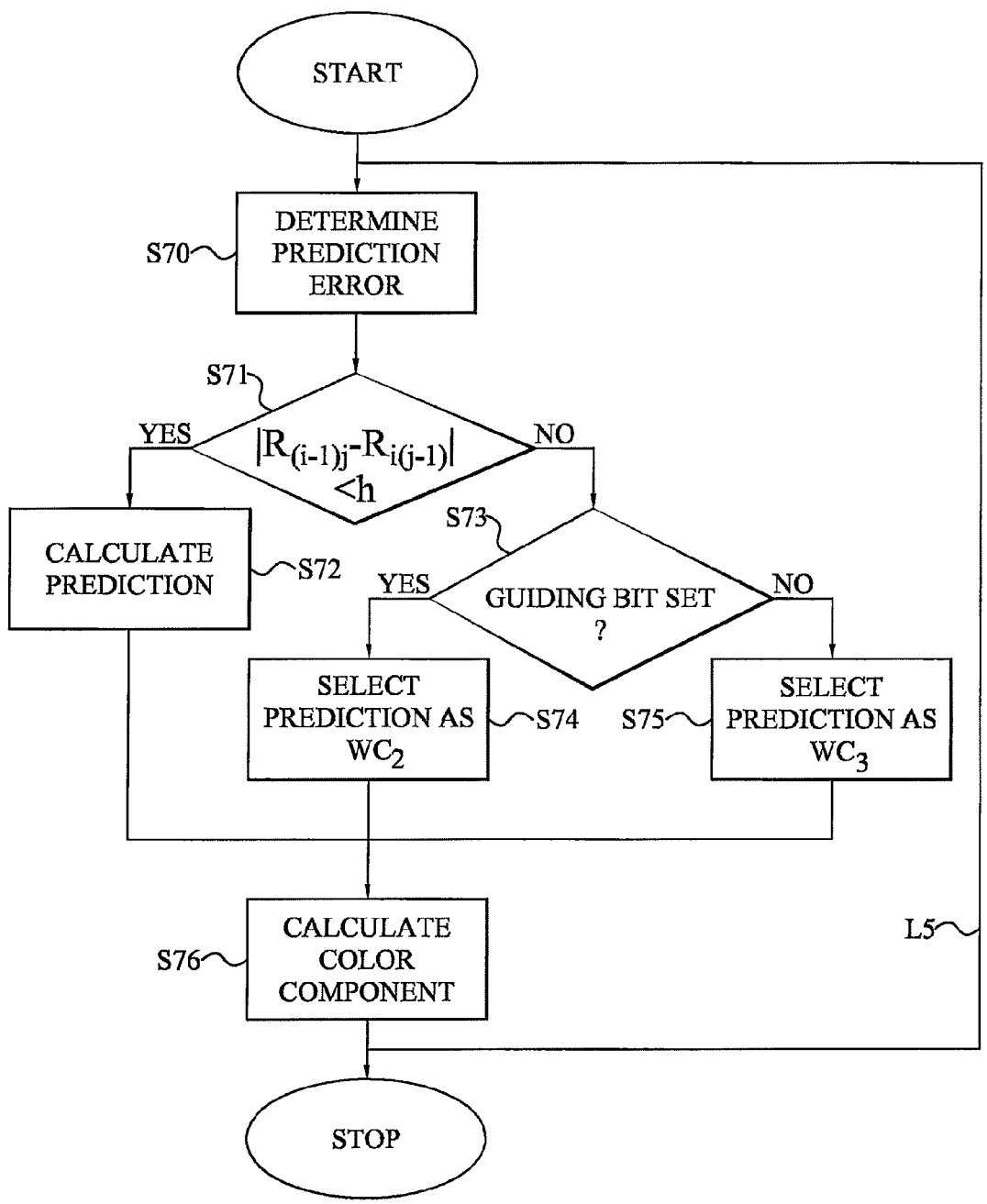
Figure 15:
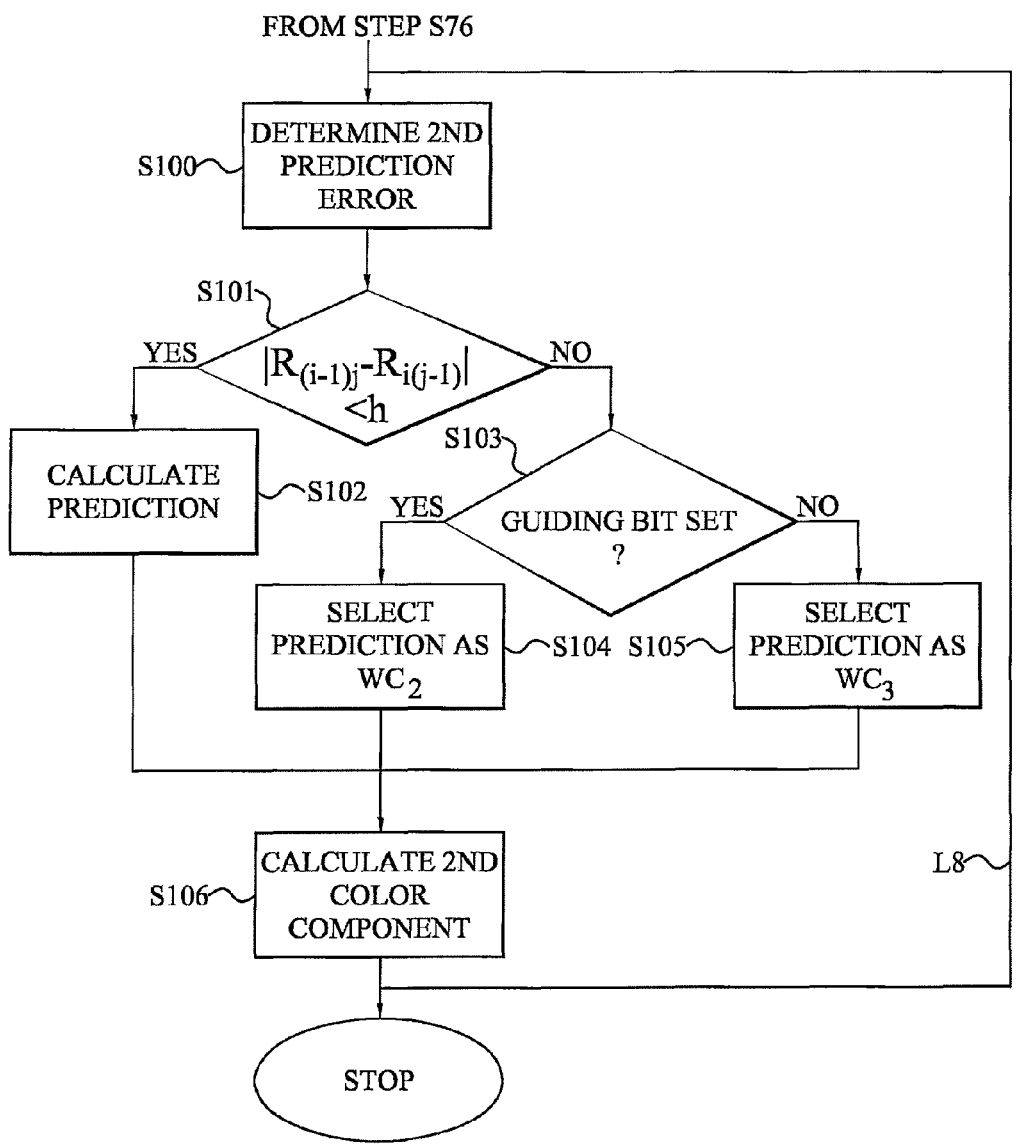
Figure 16:
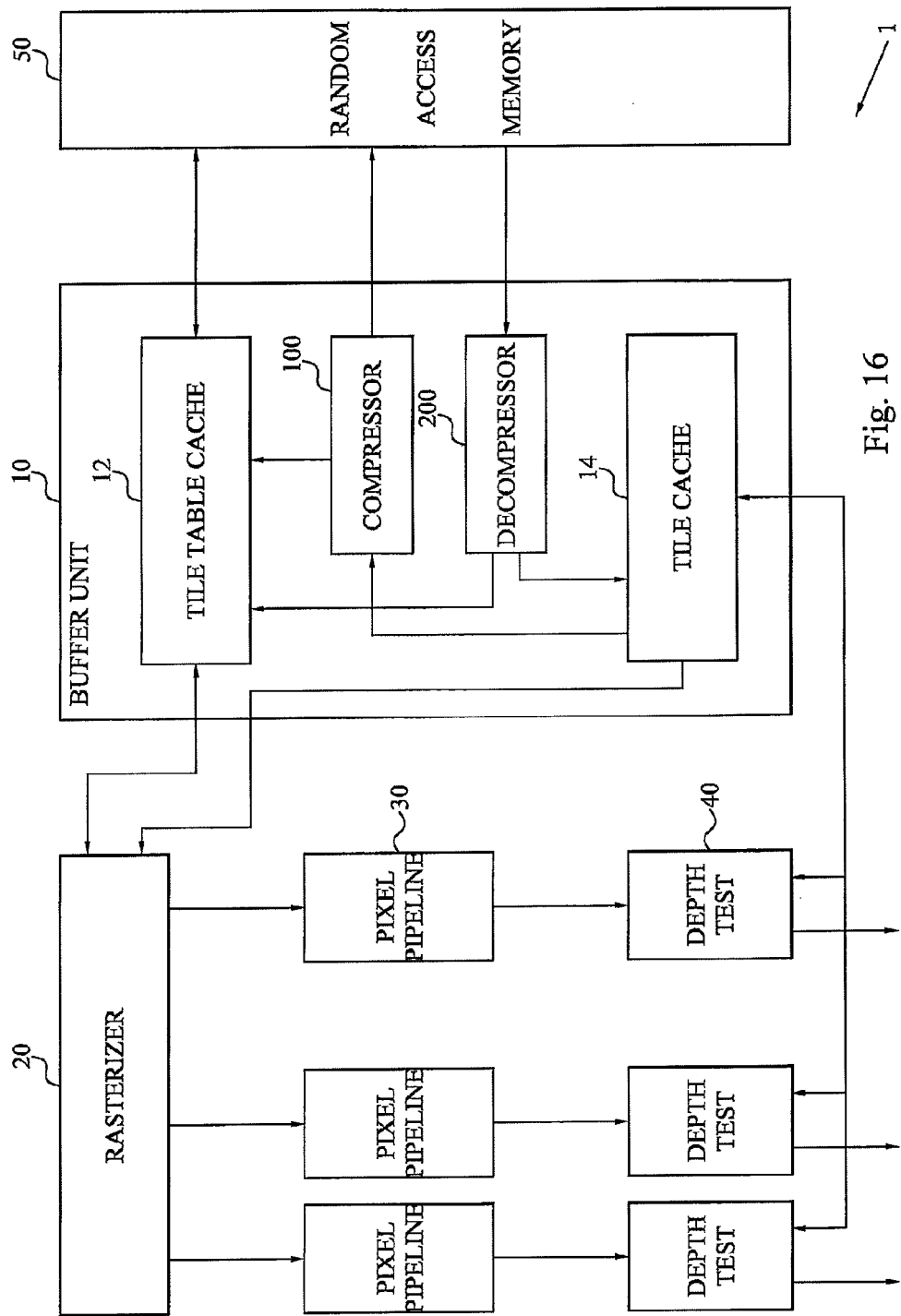
Figure 19:
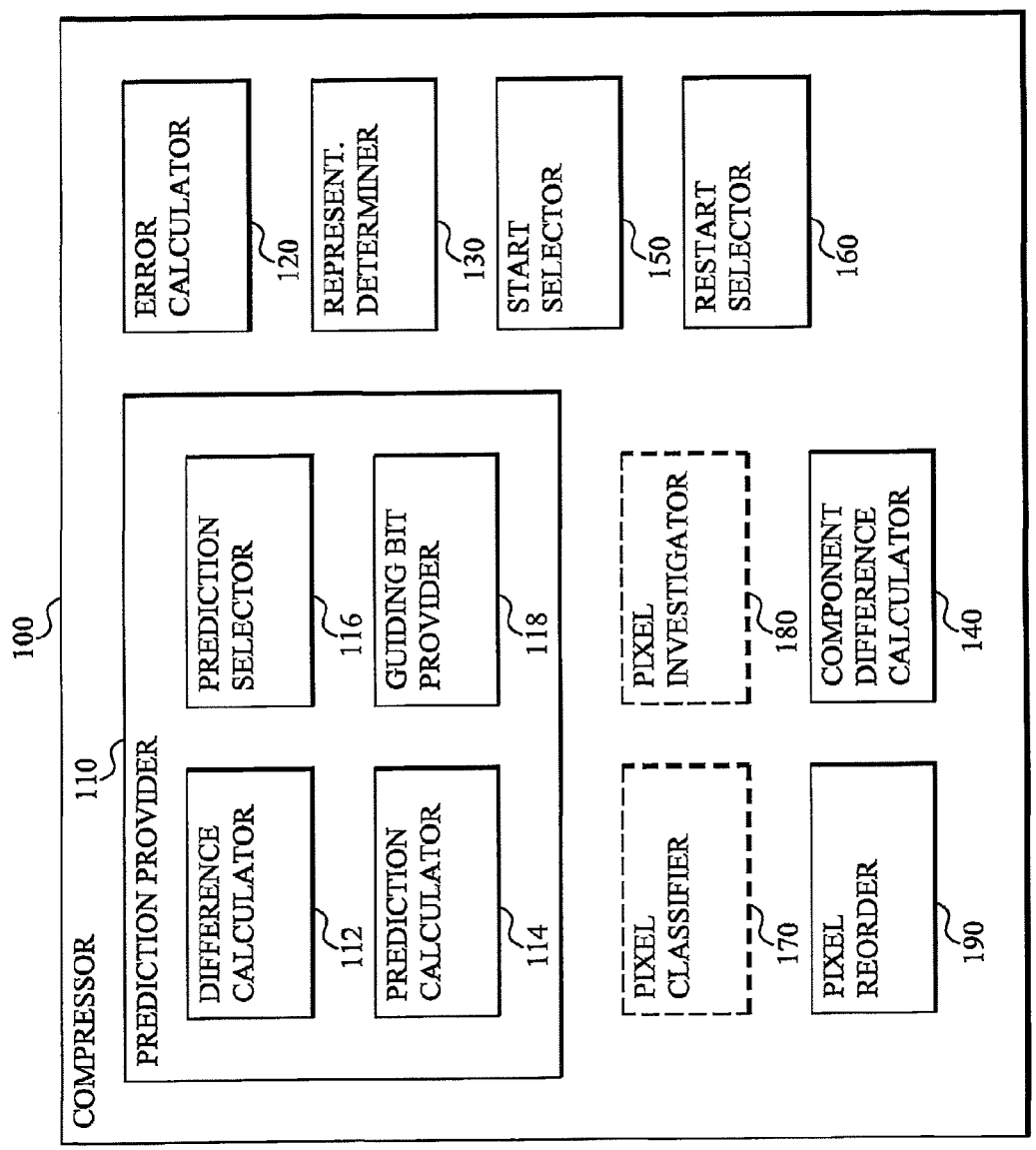
Figure 23:
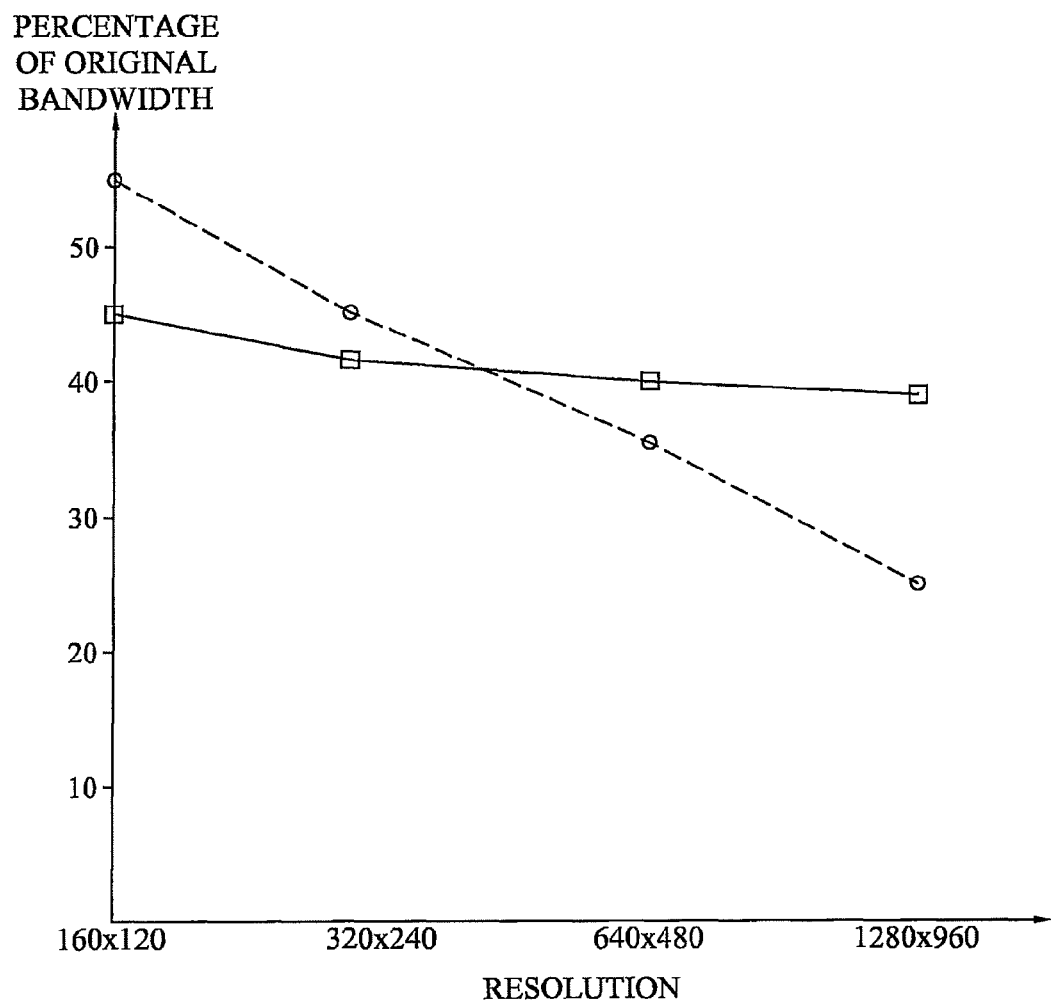

FIG. 3 schematically illustrates usage of integer numbers as representations of floating-point numbers;

FIG. 4 is a flow diagram illustrating an embodiment of the prediction calculating step of FIGS. 1, 10, 12 and 15;

FIG. 5 is a flow diagram illustrating additional steps of the compressing method in FIG. 1;

FIG. 6 is a flow diagram illustrating an additional step of the compressing method in FIG. 5;

FIG. 7 is a flow diagram illustrating an embodiment of the restart value selecting step of FIG. 6 in more detail;

FIG. 8A is an illustration of a pixel block having a restart pixel;

FIG. 8B is an illustration of the pixel block of FIG. 8A following mirroring of the pixel positions;

FIG. 8C is an illustration of the pixel block of FIG. 8A following rotation of the pixel positions;

FIG. 9 is a flow diagram illustrating an embodiment of the determining step in FIG. 1 in more detail;

FIG. 10 is a flow diagram illustrating additional steps of the compressing method in FIG. 9;

FIG. 11 is an illustration of an example of compressed representation of a pixel block;

FIG. 12 is a flow diagram of an embodiment of a block decompressing method according to the present invention;

FIG. 13 is a flow diagram illustrating additional steps of the decompressing method of FIG. 12;

FIG. 14 is a flow diagram illustrating additional steps of the decompressing method of FIG. 13;

FIG. 15 is a flow diagram illustrating additional steps of the decompressing method of FIG. 12;

FIG. 16 is a schematic block diagram of a buffer architecture to which the teachings of the present invention can be applied;

FIG. 17 is a schematic block diagram of a compressor according to an embodiment of the present invention;

FIG. 18 is a schematic block diagram of the representation determiner in FIG. 17 according to an embodiment of the present invention;

FIG. 19 is a schematic block diagram of a compressor according to another embodiment of the present invention;

FIG. 20 is a schematic block diagram of a decompressor according to an embodiment of the present invention;

FIG. 21 is a schematic block diagram of the error determiner in FIG. 20 according to an embodiment of the present invention;

FIG. 22 is a schematic block diagram of a decompressor according to another embodiment of the present invention; and FIG. 23 is a diagram comparing compression performance of the present invention with a prior art compression scheme.

DETAILED DESCRIPTION

Throughout the drawings, the same reference characters will be used for corresponding or similar elements.

The present invention generally relates to a lossless compression and decompression of pixel parameter values, and in particular such a compression and decompression suitable for color buffer compression and decompression.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

In the present invention, the compression and decompression collectively handles a plurality of pixels, typically in the form of a block or a tile of pixels. In a preferred embodiment of the invention, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and preferred such block embodiments could be 4×4 pixels, 8×8 pixels or 16×16 pixels.

The expression pixel or "image element" refers to an element in a block or encoded representation of a block. This block, in turn, corresponds to a portion of an image, texture or buffer. Thus, according to the invention, an image element could be a texel (texture element) of a (1D, 2D, 3D) texture, a pixel of a (1D or 2D) image or a voxel (volume element) of a 3D image. Generally, a pixel is characterized with an associated pixel parameter value or feature. In a preferred embodiment of the present invention, the pixel parameter value is a color value and more preferably a multi-component color value. As a consequence, the pixel color consists of multiple, i.e. at least two, color components. A typical example of such a color is a red, green, blue (RGB) color having three color components in color space. Other multi-component colors present in other color spaces, such as YUV, YCoCg or YCrCb, are also known in the art and can be used according to the present invention. In such a case, each of the color components Y, Cr and Cb can preferably each be encoded and decoded as the red (first) color component described herein. However, for these other color spaces, a reversible transform between a RGB color and a YUV/YCrCb/YCoCg color is needed, which is computationally expensive. As a consequence, a RGB color is an advantageous pixel color that can be used in the present invention.

Furthermore, in the following, the term "image" is used to denote any 1D, 2D or 3D image or texture that can be encoded and decoded by means of the present invention, including but not limited to bump maps, normal maps, photos, game type textures, text, drawings, high dynamic range images and textures, etc.

The present invention relates to prediction-based color buffer compression (coding) and decompression (decoding). The prediction-based color data processing of the invention is furthermore well-adapted for handling discontinuities in the color values caused by, for instance, sharp edges between a drawn triangle and the background. Such a dedicated discontinuity management of the present invention is not well exploited in the prior art buffer compression schemes.

Compression

FIG. 1 is a flow diagram illustrating a method of compressing a block of multiple pixels according to the present invention. Each pixel of the block has a respective color consisting of multiple color components, such as a red component, a green component and a blue color component. The block compression involves providing, for at least one pixel in the block, a prediction of a first color component of the pixel. In the following, this first color component is illustrated by a red component. This should, however, merely be seen as an illustrative example of the present invention as any other color component, such as green or blue in the case of a RGB color, could instead be handled first in the compression method.

The prediction providing operation starts in step S1. This step S1 involves calculating a difference between the red (first) color component of a first neighboring pixel in the block and the red color component of a second neighboring pixel in the block. Thus, these two neighboring pixels are adjacent the current pixel to compress in the block. Furthermore, the pixels are relating to two different prediction directions relative the current pixel. In a preferred embodiment, the two neighboring pixels include a previous pixel in a same row of the block and a previous pixel in a same column of the block. Thus, assume that the current pixel has pixel position (i,j) in the block. In such a case, the two neighboring pixels preferably occupy the positions (i−1, j) and (i,j−1), respectively.

The calculation of step S1 preferably involves calculating the difference $R_{(i-1)j}-R_{i(j-1)}$, where $R_{ij}$ denotes the red color component of pixel at block position (i, j). As it is the magnitude of the difference that is of relevance and not the sign, the absolute value or magnitude difference can be calculated in step S1 $|R_{(i-1)j}-R_{i(j-1)}|$. In an alternative approach, the squared difference is instead calculated in step S1 $(R_{(i-1)j}-R_{i(j-1)})^2$. Also other representations of magnitudes than two are of course also possible.

In either case, the calculated difference representation (magnitude difference or squared difference) is then compared to a defined threshold h. The comparison can therefore be realized as $|R_{(i-1)j}-R_{i(j-1)}|<_2 h_1$ or $(R_{(i-1)j}-R_{i(j-1)})^2<_{48} h_2$. If the (magnitude) difference between the red components of the neighboring pixels is smaller than the threshold, the method continues from step S1 step S2, otherwise it continues to step S3.

The value of the threshold h can be determined in an optimization procedure having as optimization goal to compress as many blocks of different color buffers as possible and furthermore resulting in as short block compression lengths (in terms of number of bits) as possible. A non-limiting example of a threshold value that can be used according to the present invention and obtained from a preliminary optimization procedure is $h_1=2048$ and $h_2=2048^2$. However, the actual value of the threshold depends on a number of factors, including the particular color format used, the available range for color component values, etc. This value 2048 works well for RGB colors, where the color components are represented as half-precision floating-point numbers.

Step S2 involves calculating the color component prediction of the current pixel from the red color components of the two neighboring pixels. In other words, $\hat{R}_{ij}=f(R_{(i-1)j}-R_{i(j-1)})$, where $\hat{R}_{ij}$ is the prediction of the current pixel $R_{ij}$ and f( ) is a function and in particular in the form of a first weighted combination of the two neighboring red color components, $\hat{R}_{ij}=w_{(i-1)j}^1 R_{(i-1)j}+w_{i(j-1)}^1 R_{i(j-1)}$. The first weighted combination may also be rounded, floored or ceiled to get integer prediction values.

If the difference is instead not smaller than the threshold as investigated in step S1, the method continues to the optional but preferred step S3. Step S3 comprises calculating a first difference between the red color component of the current pixel and a second weighted combination $WC_2$ of the red color components of the neighboring pixels. Step S3 also involves calculating a second difference between the red color component of the current pixel and a third different weighted combination $WC_3$ of the red color components of the neighboring pixels. In an alternative approach, the two differences are calculated between the red color components of the current pixel and respective red color components (or respective values determined from the red components) of the first and second neighboring pixels, respectively. The color component prediction of the pixel is then selected to be based on, preferably equal to, one of the second and third weighted combination of the two neighboring red components. Furthermore, this prediction selection is performed based on the two calculated differences. Generally, the weighted combination that is closest to the red component of the investigated pixel is selected. Thus, if $|R_{ij}-WC_2|<|R_{ij}-WC_3|$ (or equivalently $(R_{ij}-WC_2)^2<(R_{ij}-WC_3)^2$ or indeed, though less preferred, $|R_{ij}-R_{(i-1)j}|<|R_{ij}-R_{i(j-1)}|$) the second weighted combination of the red color components is selected as the red prediction in step S4, $\hat{R}_{ij}=WC_2$, otherwise the third weighted combination is selected as the red prediction in step S5, $\hat{R}_{ij}=WC_3$. In an alternative approach, the current pixel block is encoded first using the second weighted combination as prediction and then once again with the third weighted combination as prediction. In such a case, the weighted combination resulting in the most efficient data compression is selected as prediction for the current pixel.

According to the present invention, the three weighted combinations of the two neighboring red color components are different weighted combinations, i.e. use different weights: $WC_1=w_{(i-1)j}^1 R_{(i-1)j}+w_{i(j-1)}^1 R_{i(j-1)}$, $WC_2=w_{(i-1)j}^2 R_{(i-1)j}+w_{i(j-1)}^2 R_{i(j-1)}$, and $WC_3=w_{(i-1)j}^3 R_{(i-1)j}+w_{i(j-1)}^3 R_{i(j-1)}$. As was discussed above, in connection with the first weighted combination, the second and third weighted combinations may be rounded, floored or ceiled to get integer values.

The weights $w_{(i-1)j}^1$, $w_{i(j-1)}^1$ of the first weighted combination or linear combination are non-zero weights and are preferably in the interval $0<w^1<1$. The weights for the second and third weighted combinations are preferably also non-zero but one per weighted combination may be zero. In such a case, $WC_2=w_{(i-1)j}^2 R_{(i-1)j}$ with preferably $w_{(i-1)j}^2=1$ and $WC_3=w_{i(j-1)}^3 R_{i(j-1)}$ with preferably $w_{i(j-1)}^3=1$. In a preferred embodiment $w_{i(j-1)}^2=(1-w_{(i-1)j}^2)$ and $w_{i(j-1)}^3=(1-w_{(i-1)j}^3)$ with $0 \le w_{(i-1)j}^2$, $w_{(i-1)j}^3 \le 1$. More preferably, $w_{(i-1)j}^3=(1-w_{i(1-j)}^2)$. In such a case, the second weighted combination is $WC_2=w_{(i-1)j}^2 R_{(i-1)j}+(1-w_{(i-2)j}^2)R_{i(j-1)}$ and the third weighted combination is $WC_3=(1-w_{(i-1)j}^2)R_{(i-1)j}+w_{(i-1)j}^2 R_{i(i-1)}$. An example of suitable weight values for the second and third combinations could be $WC_2=0.75R_{(i-1)j}+0.25R_{i(j-1)}$ and $WC_3=0.25R_{(i-1)j}+0.75R_{i(j-1)}$. In the case $w_{(i-1)j}^2=1$ and $w_{i(j-1)}^2=0$, $WC_2=R_{(i-1)j}$ and $WC_3=R_{i(j-1)}$. This corresponds to selected one of the red components of the two neighboring pixels as prediction of the red component of the current pixel.

The method then continues to step S6, where a guiding bit associated with the selected prediction is provided. Thus, if the second weighted combination was selected as red prediction in step S4, the guiding bit could be set to $0_{bin}$ (or $1_{bin}$). However, if instead the third weighted combination is selected in step S5, the guiding bit could be $1_{bin}$ (or $0_{bin}$).

A next step S7 calculates a prediction error based on the red component of the current pixel and the prediction provided in step S2, S4 or S5. The prediction error $\tilde{R}_{ij}$ is preferably calculated as a difference between the original red component of the pixel $R_{ij}$ and its prediction $\hat{R}_{ij}$, $\tilde{R}_{ij}=R_{ij}-\hat{R}_{ij}$.

An encoded representation of the calculated prediction error is determined in step S8. The compressed or encoded representation of the block then comprises this encoded representation and, if the method continued from step S1 to step S3, the guiding bit provided in step S6 for the pixel.

The procedure is preferably repeated for multiple pixels in the block, which is schematically illustrated by the line L1. In such a case, the compressed block comprises a respective encoded prediction error representation for each of these pixels. In addition, some of the pixels may have an assigned guiding bit, while others have predictions calculated according to step S2 and therefore do not have any assigned guiding bits. More correctly, all pixels encoded according to the method disclose in FIG. 1 could have a guiding bit, none could have an assigned guiding bit, or at least one could have a guiding bit while at least another pixel does not have any assigned guiding bit.

FIG. 2 is a schematic illustration of a block 300 of multiple pixels 310-318. In the light of the compression method illustrated in FIG. 1, when compressing a current pixel 318, the red color components of the two neighboring pixels 312, 316 having previous positions in the same block row and block column are investigated. The prediction of the red component for the pixel 318 is then calculated based on the first weighted combination of the red components of both these neighboring pixel 312, 316 if their magnitude difference is smaller than a threshold, or otherwise one of the second and third weighted combination is selected as prediction basis.

As is well-known in the art, original color components of pixels in a color buffer are often as floating-point values, in particular as half-precision floating point numbers, i.e. fp16. The most significant bit of the 16-bit half represents a sign bit, the following five bits constitute the exponent and the ten least significant bits form the mantissa. The mathematical value of a half is $(-1)^{sign} \times 2^{(exponent-15)} \times (1.mantissa)$. The floating-point nature of halfs, however, leads to problems. Since the density of floating-point numbers is not uniform, the difference between two floats may not be representable. FIG. 3 illustrates this concept. The upper half of FIG. 3 indicates float representations. The non-uniformity of number density is clearly visible as the density increases ever closer to zero. In order to illustrate the problems of having color component representations in the form of floating-point numbers, such as halfs, assume that a first color component is 7.5 and a second component value is 1.875. Both these numbers are representable using halfs. However, the difference between the two numbers 7.5−1.875=5.625 cannot be represented as a half number. In clear contrast, the closest representation is 5.5. However, as was mentioned in the background section, color buffer compression needs to be lossless. As a consequence, block requiring the calculation of a difference between the above-mentioned halfs cannot be losslessly compressed as the difference is cannot be correctly represented in halfs.

The present invention solves this problem of floating-point numbers by mapping each floating-point number to a respective integer representation as illustrated in FIG. 3. This basically corresponds to assigning, to each floating-point number, a unique integer number. Thus, the mapping from floating-point to integer domain involves assigning ever higher integer numbers to the ever higher floating-point number. This means that 0.0 will be assigned integer representation 0, the next smallest positive floating-point number is assigned 1, the second next smallest floating-point number is assigned 2 and so on.

The example given above would correspond to adding the difference 16 to the integer number 15 to get the result of 31, or 7.5 if interpreted as a float. A preferred implementation of the present invention, therefore involves interpreting the floating-point color components as integers according to a one-to-one mapping between the floating-point domain and the integer domain. Doing the calculations and arithmetics in the integer domain also avoids costly floating-point operations. Furthermore, since the compression is lossless, a correct handling of NaN (Not a Number), Inf (Infinity) and denorms (denormal numbers) is also obtained. In such a case, during compression the floating-point numbers are interpreted as integers according to the mapping described above and illustrated in FIG. 3. Following decompression, the integer numbers are then re-interpreted back into floating-point numbers through the one-to-one mapping between integer and floating-point numbers described above.

The original color values of the pixels in the pixel are preferably unsigned 15 bits values that can be represented as fp16.

FIG. 4 is a flow diagram illustrating an embodiment of the prediction calculating step S2 of FIG. 1. The method continued from step S1 of FIG. 1. The next step S10 calculates the pixel prediction based on an average of the red color components of the two neighboring pixels $$\hat{R}_{ij} = f\left(\frac{R_{(i-1)j} + R_{i(j-1)}}{2}\right),$$

i.e. $w_{(i-1)j}^1 = w_{i(j-1)}^1 = 0.5$. In a preferred implementation, the calculated average is employed as prediction, i.e. $\hat{R}_{ij} = 0.5 \times R_{(i-1)j} + 0.5 \times R_{i(j-1)}$. If only integer predictions are employed, the quotient can be rounded or input to a floor (or ceiling function) according to $\hat{R}_{ij} = \lfloor 0.5 \times R_{(i-1)j} + 0.5 \times R_{i(j-1)} \rfloor$. Other predictions determined based on the average are also possible such as $$\hat{R}_{ij} = 2 \times \frac{R_{(i-1)j} + R_{i(j-1)}}{2} - R_{(i-1)(j-1)}.$$

The method then continues to step S7 of FIG. 7, where a prediction error is calculated based on the determined prediction.

FIG. 5 is a flow diagram illustrating additional preferred steps of the compression method of the present invention. The method starts in step S20, which comprises selecting a start component value for the block. This start value is selected to be the red (first) color component of a pixel at a selected or predefined position in the block. With reference to FIG. 2, a preferred implementation of such a predefined position is to use the first pixel 310 of the block, i.e. occupying the upper left corner. Other examples of possible start pixel positions could be any of the other block corners.

Actually any predefined position in the block could be used as start position although a corner position, and in particular the upper left corner pixel 310, significantly simplifies the compression of the block.

The compressed block comprises a representation of the start component value, $R_{start} = R_{11}$.

A next step S21 selects predictions to at least one remaining pixels 312, 314, 316 belonging to the same row or column in the block as the start pixel 310. In a preferred implementation, this involves selecting red color component prediction to be equal to the red color component of the previous neighboring pixel in the pixel row or column of the block. This means that for a pixel 312, 314 in the first row, the prediction $\hat{R}_{ij}$ is equal to $R_{i(j-1)}$, where j=2, 3, ... and $R_{11}$ is the start component value selected in step S20. The corresponding predictions for pixels 316 in the first columns are defined as $\hat{R}_{11} = R_{(j-1)i}$, where i=2, 3, ... and $R_{11}$ is the start component value. Step S21 is preferably performed for each remaining pixel of the first row and first column, schematically illustrated by the line L2.

As discussed above, prediction errors are then calculated for the different pixels as the difference between the original red color component value of the pixel and its color component prediction, i.e. $\tilde{R}_{1j} = R_{1j} - \hat{R}_{1j} = R_{1j} - R_{i(j-1)}$ or $\tilde{R}_{i1} = R_{i1} - \hat{R}_{i1} - R_{(i-1)j}$. The method then continues to step S1 of FIG. 1, where remaining pixels in the block, i.e. not present in the first row or column, are compressed as previously described.

Color buffer compression differs from other image compression in that there may, as previously mentioned, be an unnaturally sharp color discontinuity between a rendered triangle and pixels belonging to the background or to a previously rendered triangle of a very different color. There can therefore be a discontinuity edge in the block. In such a case, a so-called restart component value can be determined and employed according to the present invention. FIG. 6 illustrates this concept in more detail. The method continues from step S20 of FIG. 5. A next step S30 selects a restart component value for the block. This restart value is preferably selected to be the red (first) component of an identified pixel in the block.

The restart pixel position can be identified according to different embodiments. In a first approach, the block is compressed without the usage of any restart value at all. The same block is then compressed once for each possible restart position, i.e. all pixel positions except the previously described start pixel position. In the case of a 4×4 block, this means determining 1+15 different compressed block candidates. If the block compressed without usage of any restart value leads to a smallest compressed size, no restart values are employed and step S30 is omitted. However, if the compressed block candidate leading to smallest compressed size is one of the 15 candidates using a restart value, the position of the restart pixel is identified to be the one used in the block candidate having smallest compressed size. Furthermore, a single bit of the compressed block can be used to signal between usage of no restart value and usage of a restart value. In an alternative approach, a 4-bit restart position identifier is used for a 4×4 block. However, the first pixel position is preferably predefined to be the start position. This means that by setting the 4-bit position identifier to $0000_{bin}$, which would correspond to the start position, an implicit signaling of usage of no restart value is achieved.

An alternative method that is computationally more effective will be described further below in connection with FIG. 7.

In either case, once the restart position has been identified, a representation of the restart pixel position in the block is determined and included in the compressed representation of the block. For a 4×4 block, this representation can be a 4-bit position word. Furthermore, the block comprises a representation of the restart value, i.e. the red color component value of the pixel occupying the identified restart position.

The method then continues to step S21 of FIG. 5.

For certain blocks, the restart pixel can be present in the same block row or column as the start pixel. For instance, assume that the restart pixel is the second pixel 312 of the first row with the start pixel 310 in the upper left corner. In such a case, pixels 316 present in the first column will have the red component of the previous pixel in the column as prediction. In other words, the start value $R_{11}$ (from pixel 310) is used as the prediction for the pixel 316, the red color component value of pixel 316 is employed as prediction for the third pixel in the first column and so on. In the light of the discussion above with reference to FIG. 6, the prediction of the red color component for the third pixel 314 of the first row would be equal to the restart value. The last pixel in that row has the red component of the third pixel 314 as its color component prediction.

In an alternative approach, there may be a selection of prediction for those pixels 314 present in the same row or column as both the start 310 and restart 312 pixel. In such a case, either the start value or the restart value is employed as prediction and the one resulting in smallest prediction error is selected for the third 314 and fourth pixel of the first row. A selection bit is preferably employed and used for indicating which of the start and restart value that is used as prediction basis for the remaining pixels 314 of the row or column. For instance, a selection bit of $0_{bin}$ (or $1_{bin}$) signals that the prediction of the current pixel 314 is the start value, while a bit of $1_{bin}$ (or $0_{bin}$) indicates that the restart value was used.

In a further alternative, there is a selection between the red color component of the previous pixel in the row or column and the one of the start/restart value that was not employed as prediction basis for the previous pixel. For instance, assume that the prediction for the third pixel 314 in the first row was the restart value. In such a case, the prediction of the fourth pixel in that row can either be equal to the red color component of the third pixel 314 or the start value. A selection bit of $0_{bin}$ (or $1_{bin}$) then indicates that the prediction is equal to the color component of the previous neighboring pixel of the same row or column, while a value of 1 bin (or $0_{bin}$) signals that one of the start and restart value is employed as predication. Furthermore, the start (restart) value is selected as prediction if the neighboring pixel was predicted from the restart (start) value. In yet another alternative, there is a selection between the red color component of the previous pixel in the row or column and the closest previous pixel in the row or column that was predicted from the one of the start and the restart value that was not employed as prediction basis for the previous pixel.

FIG. 7 illustrates an embodiment of the selecting step S30 of FIG. 6. The method continues from step S20 of FIG. 5. A next step S40 identifies the restart pixel for the block. This step can be performed according to an exhaustive search of all possible restart positions as previously discussed. In an alternative approach, absolute differences to the start value is first calculated for all remaining pixels in the block, $|R_{11}-R_{ij}|$ where $(i,j)\ne(1,1)$. The pixel having a color component value differing the most from the start value is identified. The red component of this pixel is denoted $R_{diff}$ herein. Thereafter, a first absolute difference between its red color component and the start value, $|R_{ij}-R_{11}|$, and a second absolute difference between its red component and $R_{diff}$, $|R_{ij}-R_{diff}|$, is calculated for the pixels. If the first absolute difference is smaller than the second absolute difference, the pixel is classified as predictive of the start value otherwise it is classified as predictive of the restart value in step S41.

In this case, the restart pixel is identified as the first pixel in traversal order of the block having the second absolute difference larger than the first difference.

A next step S42 investigates whether the two neighboring previous pixels present in the same row or column as the current pixel to be compressed have the same classification as current pixel. If none of them has the same classification, the discontinuity edge occurs between these three pixels. As consequence, neither of the neighboring pixels is a good prediction candidate for the current pixel. The present invention can solve this problem by reordering the pixel positions of the block to obtain, for the current pixel, at least one neighboring pixel having the same classification as the pixel.

In a preferred embodiment, the reordering procedure is preferably allowed to only be performed a limited number of times, such as once. Otherwise it could be possible, depending on the particular block to be compressed, that the reordering switches back and forth between two different pixel layouts.

FIG. 8A illustrates this concept. In the figure, the start pixel 310 is in the upper left corner. An exhaustive search or the more computationally effective restart identification procedure according to above identifies, in this example, the restart pixel 311 in the upper right corner of the block. After conducting the classification procedure of step S41, pixels 314, 318 marked in white in the figure are classified as predictive based on the start value, while pixels 317 marked in grey are predictive based on the restart value. Assume that the third pixel 317 of the second row should be encoded. The two neighboring pixels 314, 318 of the same row or column have, however, different classification than the current pixel 317. This means that using the average of the red color components of neighboring pixels or either of them as prediction would lead to a very large prediction error and poor compression quality. A reordering operation can therefore be performed.

In a first embodiment, the pixel positions in the block are flipped relative a vertical line positioned between the second and third column in the block. This reordering therefore involves transforming a pixel having pixel position (i,j) in the block 300 to a new pixel position (i,5−j), where i,j=1, 2, 3, 4. The result of this reordering operation is illustrated in FIG.

8B. Note that the pixels are present on the same block row as before the reordering but becomes positioned in a new column.

In this case, the current pixel 317 has a neighboring pixel on the same row that has the same classification, while the previous pixel 314 of the same column has another classification. During compression the difference between the red color components of these two neighboring pixels 314 is calculated and compared to the threshold. As the two neighboring pixels 314 have different classifications, the difference will probably exceed the threshold. As a consequence, the red component of one of the neighbors 314 should be used as prediction according to FIG. 1. In this case, the prediction candidate will probably be the preceding neighboring pixel of the same row as it has the same classification as the current pixel 317.

FIG. 8C illustrates the result of another reordering embodiment. This embodiment involves rotating the block 300 90° to the right or left relative the rotation point positioned in the center of the block 300. Due to this reordering, a pixel having a previous position (i,j) in the block 300 gets a new pixel position (j,5−i), where i, j=1, 2, 3, 4. As is seen in the figure, the current pixel 317 now has two candidate neighboring pixels, of which one is indicated by 318 and of which one (present in the same row) has the same classification and therefore is a good prediction candidate.

If a reordering of the pixel positions has been conducted, the compressed block preferably comprises a rotate bit (also denoted flip bit or reorder bit) representative of such a pixel reordering. For instance, $1_{bin}$ (or $0_{bin}$) can indicate a rotated block, while $0_{bin}$ (or $1_{bin}$) indicates that no reordering has been performed.

In a particular embodiment, multiple different pixel reordering operations could be available. In such a case, some of these reordering operations may not solve the prediction problem as the new neighboring pixels may still be classified differently as the current pixel. Furthermore, the reordering might result in that other pixels in the block do not have any neighboring pixels of the same classification to predict from. All the different reordering operations are tested, such as a block rotation, block flip, etc. as previously described. The rotate bit is then a multi-bit rotate word that discriminates between no reordering and a particular reordering of the multiple available operations.

In one embodiment, a pixel reordering is performed if at least one pixel has two neighboring predictive pixels that have different classification as the pixel. An alternative implementation, is to first compress the block without any reordering and then again compress the block but with a position reordering. The compressed result best representing the original block, i.e. resulting in shortest compressed block representation is selected and used as compressed representation for the current block. The method then continues to step S21 of FIG. 5.

FIG. 9 is a flow diagram illustrating an embodiment of determining the encoded representation of the prediction error of FIG. 1. The method continues from step S7 of FIG. 1. A next step S50 modifies the prediction error to get a positive predictive error. This modification preferably involves applying the function n(x)=−2x to negative prediction errors (including zero errors) and the function p(x)=2x−1 to positive ones (excluding zero errors). This will result in a new arrangement of prediction errors as {0, 1, −1, 2, −2, 3, −3, ...}, which means that numbers of small magnitudes will have small value. Each modified prediction error is then preferably Golomb-Rice encoded to obtain the encoded representation.

The Golumb-Rice encoding involves searching for an exponent number k. This number k is preferably employed for a set of at least one pixel in the block. For instance, four pixels in a 2×2 group in the block can share the same k. An exhaustive search among available values of k, such as between 0 and 15 can be used to find the best k for the group. However, the search can be computationally reduced by only looking at a selected portion of the available k values. This preferred k searching comprises searching for a k in an interval of [p−4, p], where p is the bit position of the most significant bit of the largest prediction error of the pixel group.

A next step S52 divides each prediction error of the group by $2^k$ to form a respective quotient and a remainder. The quotients are unary encoded in a next step S53. This unary encoding is preferably performed according to Table 1 below.

TABLE 1

| unary codes | |
|---|---|
| Unary code | Quotient |
| $0_{bin}$ | 0 |
| $10_{bin}$ | 1 |
| $110_{bin}$ | 2 |
| $1110_{bin}$ | 3 |
| $11110_{bin}$ | 4 |
| ... | ... |

Unary encoding assigns longer codes to larger values as is evident from Table 1. Generally values larger than 31 are encoded using $0xffff_{hex}$, followed by the 16 bits of the value.

The encoded representation of the prediction error comprises the unary code and the k bits of the remainder. In addition, the value k is stored for the group of pixels. This procedure is performed for each pixel in the block with the exception of the start pixel and the restart pixel. As was mentioned above, the original color component values for these pixels are stored as start and restart component values, respectively.

Even though Golumb-Rice coding is a possible coding algorithm that can be used, the present invention is not limited thereto. Instead other coding algorithms, including Huffman coding or Tunstall coding, can alternatively be employed.

Whereas the red (first) color component is encoded independently of the other data, the green (second) color component is preferably encoded relative the red components. This situation is illustrated in FIG. 10. The method continues from step S8 of FIG. 1. A next step S60 calculates a respective component difference for each pixel in the block. This component difference is a difference between the green and the red component of the pixels, $G_{ij}-R_{ij}$. Thereafter a respective prediction for the second color components in the block is provided.

Firstly, it is investigated whether the magnitude/squared difference between the red color components of the two neighboring pixels exceed the threshold in step S61. This step S61 is performed similar to step S1 of FIG. 1. Thus, even though predictions of the green color component are to be provided, the investigation in step S61 employs red color component values.

If the difference is smaller than the threshold, the method continues to step S62. Step S62 calculates the prediction based on the first weighted combination of a first difference between the green and red color components of the first neighboring pixel and a second difference between the green and red color components of the second neighboring pixel. In other words, $G_{ij}-R_{ij}=w_{(i-1)j}^{1}(G_{(i-1)j}-R_{(i-1)j})+w_{i(j-1)}^{1}(G_{i(j-1)}-$ $R_{i(j-1)}$), or a rounded, floored or ceiled weighted combination. In a preferred embodiment, the prediction is preferably calculated based on the average of the two component differences and more preferably equal to the average, $$G_{ij} \hat{-} R_{ij} = \frac{(G_{(i-1)j} - R_{(i-1)j}) + (G_{i(j-1)} - R_{i(j-1)})}{2}$$

or $$G_{ij} \hat{-} R_{ij} = \left\lfloor \frac{(G_{(i-1)j} - R_{(i-1)j}) + (G_{i(j-1)} - R_{i(j-1)})}{2} \right\rfloor$$

in the case of a floor function.

However, if the magnitude difference between the neighboring red color components exceeds the threshold in step S61, the method instead continues to step S63. Step S63 uses the guiding bit determined in step S6 for the current pixel to select either the second weighted combination of the two differences as prediction $G_{ij}\hat{-}R_{ij}=w_{(i-1)j}^2(G_{(i-1)j}-R_{(i-1)j})+w_{i(j-1)}^2(G_{i(j-1)}-R_{i(j-1)})$ in step S64 or the third weighted combination as prediction $G_{ij}\hat{-}R_{ij}=w_{(i-1)j}^3(G_{(i-1)j}-R_{(i-1)j})+w_{i(j-1)}^3(G_{i(j-1)}-R_{i(j-1)})$ in step S65. Thus, if the second weighted combination of red color components was selected as prediction for the current pixel in step S4 of FIG. 6, the guiding bit was set in step S6 and the second weighted combination of differences in color components is selected as the second prediction for the pixel in step S64. Otherwise the third weighted combination of the differences is selected a second prediction in step S65 if the guiding bit was not set as the third weighted combination of neighboring red color components was selected as first prediction of the pixel in step S5. These second and third weighted combinations may also be rounded, floored or ceiled.

In a preferred embodiment, the weights employed for determining the three different weighted combinations of color component differences described above and disclosed in FIG. 10 are preferably the same weights that was employed in FIG. 1 for determining the three different weighted combinations of red color components.

The next step S66 calculates a prediction error for the green color component of the pixel as the difference between green and red components of the pixel and the selected prediction $G_{ij}\hat{-}R_{ij}=(G_{ij}-R_{ij})-(G_{ij}\hat{-}R_{ij})$. A next step S67 involves determining a second encoded representation of the second prediction error calculated in step S66. This step S67 is preferably performed similar to step S8 described above in connection with FIG. 9 with the following differences. The start and restart pixels are not treated separately, but are fed into the Golomb-Rice (Hoffman or Tunstall) encoding just as the other predictions are. Thus, for the start pixel, the following difference is Golomb-Rice encoded $G_{11}-R_{11}$, and the same applies to the restart pixel.

For those pixels present on a same row or column as the start and/or restart pixel, the compression is performed similar to the red color component with the addition that the difference between the green and red color components is used. Thus, pixels of the same row as the start pixels have second prediction errors as: $G_{ij}\hat{-}R_{1j}=(G_{1j}-R_{1j})-(G_{1j}\hat{-}R_{1j})=(G_{1j}-R_{1j})-(G_{1(j-1)}-R_{1(j-1)})$.

The same procedure is then performed for the blue (third) and remaining color component as discussed above in connection with FIG. 9. However, in this case the difference between the blue and the green component is calculated in step S60, $B_{ij}-G_{ij}$. In an alternative approach, the difference is instead calculated between the blue and the red component in step S60, $B_{ij}-R_{ij}$.

FIG. 11 is a schematic illustration of a compressed representation 400 of a pixel block compressed according to the present invention. The compressed block 400 preferably comprises a restart bit 410. This bit is set, i.e. equal to $1_{bin}$, if a restart pixel is used for the current block. In such a case, the compressed block also comprises an indication 420 of the restart pixel position and a representation 430 of the restart value. A reordering bit 440 signals whether any pixel position reordering has been performed or not. A representation 450 of the start value is also included compressed block 400. The compressed block 400 further comprises representations 460 of the determined k values, the guiding bits 470 and the unary code of the quotient and the remainders from the Golomb-Rice encoding, denoted encoded error representations 480 in the figure.

The actual order of the included components of the compressed block 400 may differ from what is illustrated in FIG. 11.

Compression Example

Assume a pixel block as illustrated in FIG. 2 and having the following color component values for the red component.

| 10001 | 10002 | 10003 | 10004 |
| 11    | 10003 | 10004 | 10005 |
| 12    | 10    | 8     | 6     |
| 13    | 11    | 9     | 7     |

The start value corresponds to the first pixel in the block, i.e. $R_{start}=R_{11}=10001$. In the present case, it is not hard to identify a sharp discontinuity in the red color components at the edge running so that the first row and the last three pixels of the second row are best predicted by the start value while the other pixels are not.

A restart value can be identified by calculating an absolute difference, for each pixel, between its red color component and the start value, $|R_{ij}-R_{start}|$:

| 0    | 1    | 2    | 3    |
| 9990 | 2    | 3    | 4    |
| 9989 | 9991 | 9993 | 9995 |
| 9988 | 9990 | 9992 | 9994 |

The pixel differing the most from the start value is the fourth pixel of the third row. As a consequence, $R_{diff}=R_{34}=9995$. The absolute differences between the red component of the pixel and $R_{start}$ and $R_{diff}$ are then calculated. If $|R_{ij}-R_{start}|<|R_{ij}-R_{diff}|$, the pixel is assigned a temporary classification bit of $0_{bin}$, indicating that it is predictive of the start value, otherwise it is predictive of the restart value and becomes assigned with $1_{bin}$. The result for the current block is indicated below.

| 0 | 0 | 0 | 0 |
| 1 | 0 | 0 | 0 |
| 1 | 1 | 1 | 1 |
| 1 | 1 | 1 | 1 |

The temporary classification bits are then investigated in traversal order, i.e. starting from the left and going to the right in the first row, then starting from the left and going to the right in the second row and so on. The first pixel having classification bit $1_{bin}$ is identified as restart pixel. In the present example the first pixel in the second row is identified and therefore $R_{restart}=R_{21}=11$.

First the pixels in the first row are compressed using the prediction procedure of $\tilde{R}_{1j}=R_{1j}-\hat{R}_{1j}=R_{1j}-R_{1(j-1)}$. Thus, the prediction error for the second pixel in the row is $\tilde{R}_{12}=R_{12}-\hat{R}_{12}=R_{12}-R_{11}=10002-10001=1$. Continuing this procedure for the remaining pixels in the first row gives the series of prediction errors or 1, 1, 1.

Thereafter the two remaining pixels of the first column are predicted according to $\tilde{R}_{i1}=R_{i1}-\hat{R}_{i1}-R_{(i-1)1}$. This results in, for the third pixel of the first column, $\tilde{R}_{31}=R_{31}-\hat{R}_{31}=R_{31}-R_{21}=12-11=1$. Also the prediction for the last pixel of that row is 1. The partly compressed block has the following prediction errors:

| 10001 | 1 | 1 | 1 |
|---|---|---|---|
| 11 | | | |
| 1 | | | |
| 1 | | | |

Thereafter the second pixel of the second row is investigates according to FIG. 1. The difference between the two neighboring red color components are calculated and compared to the threshold value $(10002-11)^2=9991^2>2048^2$. This means that the prediction provision should be conducted according to step S3 to S6 of FIG. 1. In this example $w_{(i-1)j}^2=(1-w_{i(j-1)}^2)=1$ and $w_{i(j-1)}^3=(1-w_{(i-1)j}^3)=1$. The absolute differences between the red components of the neighboring pixels and the current pixels are calculated and compared $|10003|10002|<|10003-11|$. This means that the prediction of pixel component $\hat{R}_{22}=R_{12}=10002$ due to the particular choice of weights in the current example. The guiding bit is set to $1_{bin}$, indicating that prediction is performed along the same column and not row. The prediction error is then calculated as $\tilde{R}_{22}=R_{22}-\hat{R}_{22}=R_{22}-R_{12}=10003-10002=1$.

Thereafter the third pixel of the second row is investigated. The squared difference between the neighboring red color components are calculated as above $(10003-10003)^2=0<2048^2$. The prediction should therefore be provided according to step S2 of FIG. 1. This means that preferably the average of the neighboring color components is calculated and used as prediction $$\hat{R}_{23}=\left\lfloor\frac{R_{22}+R_{13}}{2}\right\rfloor=\left\lfloor\frac{10003+1003}{2}\right\rfloor=10003.$$

The resulting prediction error is $\tilde{R}_{23}=R_{23}-\hat{R}_{23}=10003-10003=0$. Continuing this procedure for the remaining block leads to the following prediction errors.

| 10001 | 1 | 1 | 1 |
|---|---|---|---|
| 11 | 1* | 0 | 1 |
| 1 | -2** | -2** | -2** |
| 1 | 0 | 0 | 0 |

*A guiding bit of $1_{bin}$ is used.
**A guiding bit of $0_{bin}$ is used.

Thereafter the prediction errors can be encoded using Golomb-Rice coding as previously described.

Assume that the green color components for the current block have the following values

| 10020 | 10023 | 10026 | 10029 |
|---|---|---|---|
| 20 | 10021 | 10024 | 10027 |
| 18 | 19 | 20 | 21 |
| 16 | 17 | 18 | 19 |

First the differences between the respective green and red color components are calculated to obtain the following values.

| 19 | 21 | 23 | 25 |
|---|---|---|---|
| 9 | 18 | 20 | 22 |
| 6 | 9 | 12 | 15 |
| 3 | 6 | 9 | 12 |

The first pixel row is then treated as described above with the previous pixel value as prediction. The resulting prediction errors therefore become 2, 2, 2 for the last three pixels of the first row. The corresponding prediction errors for the last two pixels of the first column are −3, −3.

According to the guiding bit for pixel at position (2, 2), the prediction is equal to the value for the neighboring pixel in the same column. The prediction error then becomes $18-21=-3$.

The third pixel of the second row should be predicted based on both neighboring pixels. Its prediction error is therefore $$20-\left\lfloor\frac{23+18}{2}\right\rfloor=0.$$

Continuing the procedure for the remaining pixels give the prediction errors for the green component:

| 19 | 2 | 2 | 2 |
|---|---|---|---|
| 9 | -3 | 0 | 0 |
| -3 | 3 | 3 | 3 |
| -3 | 0 | 0 | 0 |

The same procedure is then performed for the blue component.

Decompression

FIG. 12 is an illustration of a flow diagram showing a method of decompressing or decoding a compressed or coded pixel block according to the present invention. The method starts in step S70, where a prediction error is determined for a pixel of the block to be decoded. This prediction error is determined based on an encoded error representation associated with the pixel and included in the compressed block. Step S70 therefore involves utilizing the encoded error representation for calculating the pixel prediction error.

The prediction error is preferably performed by Golomb-Rice (or Hoffman or Tunstall, for instance) decoding the encoded representation of the prediction error. In such a case, the prediction error preferably comprises a unary coded quotient, a remainder and an exponent value k. In such a case, the quotient can be obtained from the unary coded data using Table 1 above. Thereafter, the quotient and remainder forms a value that is multiplied by $2^k$ to form the prediction error.

A prediction of a red (first) color component of the pixel is provided. The prediction provision involves calculating a difference in between the red color components of two neighboring pixels in the block. These two pixels are adjacent pixels of different prediction directions in the block and preferably are positioned at a previous pixel position in the same row or column in the block as the current pixel to be decoded.

The difference is preferably the absolute difference or the squared difference to only provide a magnitude representation of the difference irrespective of the sign. The difference is compared with a predefined threshold in step S71. If the difference is smaller than the threshold, the color component prediction is performed according to step S72 otherwise the method continues to step S73.

Step S72 calculates the component prediction from the red color components of the two neighboring pixels in the block and which were employed for calculating the difference used in the comparison of step S71. The component prediction is preferably calculated based on a first weighted combination with non-zero weights, preferably an average of the two red color components as discussed above and illustrated in step S10 of FIG. 4, which is a detailed implementation of a preferred embodiment of step S72.

If the difference is not smaller than the threshold as determined in step S71, step S73 investigates the (bit) value of a guiding bit associated with the coded pixel and included in the compressed pixel block. If the guiding bit has a first bit value, such as $1_{bin}$, the method continues to step S74. However, if the guiding bit instead has a second bit value, such as $0_{bin}$, the prediction provision is conducted according to step S75. Step S74 involves selecting the color component prediction to be based on, preferably equal to, a second weighted combination of the red color components of the two neighboring pixels in the block. Step S75 correspondingly involves selecting a third weighted combination of the red color components of the neighboring pixels in the block as component prediction for the pixel. This means that in this case the guiding bit included in the block for the current pixel dictates which of the two possible candidate predictions that is to be used for the pixel.

Finally, step S76 calculates a representation of the red color component of the pixel based on the prediction error determined in step S70 and the component prediction provided in step S72, S74 or S75. This calculation is preferably implemented by adding the determined prediction error to the component prediction to get the red color component of the (partly) decoded pixel.

The decompressing method of FIG. 12 is preferably repeated for each pixel in the block to be decoded, which is schematically illustrated by the line L5. This means that the method can be performed once or multiple times, such as once per pixel in block, for a given compressed block.

FIG. 13 is a flow diagram illustrating additional steps of the decompressing method. The method starts in step S80, which provides a red color component of a start pixel in the block based on a representation of a start component value included in the compressed block. In a preferred embodiment, the start value is provided in uncoded form in the compressed block and can therefore be assigned directly as red color component of the start pixel. This pixel has a predefined positioned in the block as previously discussed, preferably at (i,j)=(1,1).

Step S81 provides a prediction for a next pixel in the same pixel row or column as the start pixel. The step S81 involves using the red color component of the start pixel, i.e. the start component value as prediction for the neighboring pixel. The color component of the pixel is then determined based on this component prediction and the prediction error determined for the pixel.

Step S81 is preferably repeated for the remaining pixels in the (first) pixel row or column comprising the start pixel, schematically illustrated by the line L6. However, for these other pixels, the prediction is not necessarily the red color component of the start pixel but in clear contrast equal to the red color component of the most previous neighboring pixel in the same row or column as the current pixel. As a consequence, decompression of the complete block can first be performed according to step S80 to decode the start pixel. Thereafter the first neighboring pixels in the first row and column are decoded in step S81 based on the color component value of the start pixel. The next pixels in the first row and column are then decoded in step S81 based on the first color component value of the first neighboring pixels determined in the first round of step S81, and so on until the end of the row/column is reached or a restart pixel is reached. The method thereafter continues to step S70 where remaining pixels in the block are decoded as disclosed in FIG. 12.

FIG. 14 is a flow diagram illustrating additional steps of the decompression method in the case of a restart pixel in the block. The method continues from step S80 of FIG. 13. A next step S90 investigates whether there is any restart pixel in the block and in such a case identifies the restart pixel. The compressed block preferably comprises a restart bit signaling whether the block comprises the restart pixel or not. The investigation of step S90 is therefore preferably performed based on such a restart bit. Furthermore, the compressed block preferably comprises a position word representing the pixel position of the restart pixel among the multiple pixels in the block. Step S90 preferably uses such position information in identifying the correct pixel position.

A next step S91 provides the red color component of the restart pixel. The provision is performed based on a representation of a restart component value included in the compressed pixel block. In a preferred implementation, the restart value is included in uncoded form and can therefore be assigned directly as red color component of the restart pixel.

The method thereafter continues to step S81 of FIG. 13.

FIG. 15 is a flow diagram illustrating additional methods for determining a green (second) color component of the pixels in the block. The method continues from step S76 of FIG. 12. A next step S100 determines a second prediction error for a pixel to be decoded. This prediction is determined similar to the first prediction discusses in connection with step S70 of FIG. 12. In other words, the prediction is determined based on an encoded representation included in the compressed pixel block. This means that the encoded representation preferably comprises a unary coded quotient, a remainder and an exponent value k. The prediction error determination of step S100 therefore preferably involves Golomb-Rice (Hoffman or Tunstall) decoding the encoded representation.

Thereafter the prediction of the green color component is determined for the pixel. Firstly, the difference between red color components of the two previous neighboring pixels are determined and utilized in step S101 to determine whether the prediction provision is to be conducted according to step S102 or according to one of step S104 and S105. This step S101 is performed in the same way as step S71 of FIG. 12.

If the (absolute or squared) difference is smaller than the threshold in step S101, step S102 calculates the prediction from a first weighted combination (using non-zero weights) of a first difference between the green and red color component of the first neighboring pixel and a second difference between the green and red color components of the second neighboring pixel. The calculation is preferably performed as indicated by step S10 of FIG. 4. In other words an average of the two differences is calculated and the prediction is preferably determined based thereon, preferably set equal to the average $$G_{ij} \stackrel{\triangle}{=} R_{ij} = \frac{(G_{(i-1)j} - R_{(i-1)j}) + (G_{i(j-1)} - R_{i(j-1)})}{2} \text{ or}$$

$$G_{ij} \stackrel{\triangle}{=} R_{ij} = \left\lfloor \frac{(G_{(i-1)j} - R_{(i-1)j}) + (G_{i(j-1)} - R_{i(j-1)})}{2} \right\rfloor.$$

If the (absolute or square) difference exceeds the threshold in step S101, the method continues to step S103, which uses the guiding bit to select which of two possible candidate predictions to use for the current pixel. If the guiding bit has a first value the method continues to step S104, where the prediction is selected to be based on or equal to the second weighted combination of the differences between green and red color components of the neighboring pixels. However, if the guiding bit has another value, the third weighted combination of the differences between the green and red color components of the two neighboring pixels is instead selected in step S105.

The method then continues to step S106, where a representation of the green color component of the pixel is determined based on the prediction error determined in step S100 and the component prediction provided in step S102, S104 or S105. This step S106 preferably involves adding the prediction to the prediction error to get a difference between the green and red color components of the pixel. The green color component can then be determined by simply adding the previously determined red color component (from step S76 of FIG. 12).

The procedure is repeated for all pixels of the block to be decoded, schematically illustrated by the line L8.

In order to decode the blue (third) component, the procedure described above in connection with FIG. 15 is repeated. However, in this case the difference between the blue and green color components (or between the blue and red components) is handled instead of the difference between the green and red components.

Correspondingly, pixels present on the same row or column as the start and/or restart pixels are decoded as discussed above in connection with steps S81 and S92 of FIGS. 13 and 14. However, instead of providing the prediction of the red color component to be equal to the red color component of the neighboring pixel, the prediction is equal to a difference between the green and red or blue and green color components of the neighboring pixel.

The method preferably also involves investigating whether a reordering of pixel positions in the block should be performed. This decision is preferably performed based on a reordering or rotate bit included in the compressed pixel block. If the bit has a first value, such as $0_{bin}$, no reordering is done, otherwise pixel positions are reorder as described above, for instance by a block rotation or block flip. An example of such a reordering is the mapping from pixel position (i, j) to (i,5−j) or (5−j,i).

Decompression Example

In the following example a block size as illustrated in FIG. 2 and a compressed block layout as illustrated in FIG. 11 are assumed.
Restart bit: $1_{bin}$
Restart position: $0100_{bin}$
Restart value: $000000000001011_{bin}$
Reorder bit: $0_{bin}$
Start value: $010011100010001_{bin}$
k values: $X_1 X_2, \ldots X_n$, where $X_i = 0/1_{bin}$, i=1 . . . n
Guiding bit: 1 0 0 0 bin Encoded representation: where $Y_1 Y_2 \ldots Y_m$, where $Y_i = 0/1_{bin}$, i=1 . . . m The restart bit is set for the current block, implying that a restart pixel should be used. The position of this restart pixel is position number $0100_{bin} = 4$, which corresponds to (2, 1) if (1, 1) has position number 0, (1, 2) has position number 1 and so on in traversal order. The restart value is $000000000001011_{bin} = 11$. As a consequence, $R_{(2, 1)} = R_{restart} = 11$. The start pixel is at position (1, 1) and the start value is $010011100010001_{bin} = 10001$. Therefore, $R_{(1, 1)} = R_{start} = 10001$. The partly decoded block now looks like:

| 10001 |
|---|
| 11 |

Thereafter the block is decoded in traversal order starting with the first row. The prediction of the next pixel at position (1, 2) is $\hat{R}_{(1, 2)} = R_{(1, 1)} = 10001$.

In the following example, the prediction errors are determined through Golomb-Rice decoding, which is not disclosed herein. Therefore assume that the decoded first prediction errors for the block are as present below:

| — | 1 | 1 | 1 |
|---|---|---|---|
| — | 1 | 1 | 1 |
| 1 | −2 | −2 | −2 |
| 1 | 0 | 0 | 0 |

The red color component of the second pixel can then be calculated as: $R_{(1, 2)} = \tilde{R}_{(1, 2)} + \hat{R}_{(1, 2)} = 1 + 10001 = 10002$. The corresponding color component of the third pixel in the first row is $R_{(1, 3)} = \tilde{R}_{(1, 3)} + \hat{R}_{(1, 3)} = \tilde{R}_{(1, 3)} + R_{(1, 2)} = 1 + 10002 = 10003$. The procedure is repeated for the fourth and last pixel in the first row to give the partly decoded block of:

| 10001 | 10002 | 10003 | 10004 |
|---|---|---|---|
| 11 | | | |

Thereafter, the pixels in the first column are decoded. The red color component of the third pixel in the column is $R_{(3, 1)} = \tilde{R}_{(3, 1)} + \hat{R}_{(3, 1)} = \tilde{R}_{(3, 1)} + R_{(2, 1)} = 1 + 11 = 12$. The final pixel in the first column is decoded in a similar way to get the block of:

| 10001 | 10002 | 10003 | 10004 |
|---|---|---|---|
| 11 | | | |
| 12 | | | |
| 13 | | | |

Pixel at position (2, 2) is now to be decoded. In this decoding example, the same weights that were used in the previous compression example are employed herein for the first, second and third weighted combinations. The difference between the neighboring color components $R_{(1, 2)}$ and $R_{(2, 1)}$ is calculated and the squared difference is compared to the predefined threshold of, in this example, $2048^2$: $(R_{(1, 2)} - R_{(2, 1)})^2 = (10002 - 11)^2 = 9991^2 > 2048^2$. This means that the pixel is associated with a guiding bit and should be predicted from only one of the neighboring first color components as the weights of the second and third combinations are one and zero, and zero and one, respectively. The guiding bit is in this case $1_{bin}$, implying that the neighboring pixel of the same column should be used as prediction, i.e. $R_{(2, 2)}=\tilde{R}_{(2, 2)}+\hat{R}_{(2, 2)}=\tilde{R}_{(2, 2)}+R_{(1, 2)}1+10002=10003$.

Repeating this procedure for the pixel at position (2, 3) gives: $(R_{(1, 3)}-R_{(2, 2)})^2=(10003-10003)^2=0<2048^2$. The pixel should therefore be predicted from both the neighboring red color components:

$$R_{(2,3)} = \tilde{R}_{(2,3)} + \hat{R}_{(2,3)}$$
$$= \tilde{R}_{(2,3)} + \left\lfloor \frac{R_{(1,3)} + R_{(2,2)}}{2} \right\rfloor$$
$$= 1 + 10003 = 10004.$$

The same operation is performed for the last pixel of the second row to get the partly decoded block of:

| 10001 | 10002 | 10003 | 10004 |
|-------|-------|-------|-------|
| 11    | 10003 | 10004 | 10005 |
| 12    |       |       |       |
| 13    |       |       |       |

Pixel at position (3, 2) is now to be decoded. The difference between the neighboring color components $R_{(2, 2)}$ and $R_{(3, 1)}$ is calculated and the squared difference is compared to the predefined threshold: $(R_{(2, 2)}-R_{(3, 1)})^2=(10003-12)^2=9991^2>2048^2$. This means that the pixel is associated with a guiding bit and should be predicted from only one of the neighboring first color components. The guiding bit is in this case $0_{bin}$, implying that the neighboring pixel of the same row should be used as prediction, i.e. $R_{(3, 2)}=\tilde{R}_{(3, 2)}+\hat{R}_{(3, 2)}=\tilde{R}_{(3, 2)}+R_{(3, 1)}=-2+12=10$. Continuing this procedure along the third row gives the block of:

| 10001 | 10002 | 10003 | 10004 |
|-------|-------|-------|-------|
| 11    | 10003 | 10004 | 10005 |
| 12    | 10    | 8     | 6     |
| 13    |       |       |       |

Finally the remaining pixels of the last column are processed. In this case all of these pixels will be predicted from the average red color components of their respective neighboring pixels, given the final block for the first color component of:

| 10001 | 10002 | 10003 | 10004 |
|-------|-------|-------|-------|
| 11    | 10003 | 10004 | 10005 |
| 12    | 10    | 8     | 6     |
| 13    | 11    | 9     | 7     |

Thereafter the two remaining color components are decoded. Assume that the second prediction errors for the start and restart pixels are 19 and 9, respectively, as determined from the compressed block. This means that $G_{(1, 1)}-R_{(1, 1)}=19$ and $G_{(2, 1)}-R_{(2, 1)}=9$. The green components of these two pixels are obtained by simply adding the respective decoded red components to the prediction errors to get $G_{(1, 1)}=10020$ and $G_{(2, 1)}=20$.

The remaining pixels are then decoded starting from the start and restart values for the green component. The procedure is repeated for the blue and final color component.

Implementation Aspects

FIG. 16 is a schematic overview of a color buffer architecture 1, to which the teachings of the present invention can be applied. The architecture comprises a random access memory (RAM) 50 for storing pixel blocks comprising, among others, color buffers. A buffer unit 10 comprises a decompressor 200 according to the present invention for decompressing compressed blocks fetched from the RAM 50. The decompressed or decoded blocks are temporarily stored in an associated tile cache 14 of the buffer unit 10. A compressor 100 according to the present invention is also provided in the buffer unit 10 for compressing pixel blocks present in the cache 14 for storage in the RAM 50.

In a preferred embodiment, the buffer unit 10 also comprises a tile table cache 12. This table cache 12 stores header information associated with the pixel blocks but kept separately from the color buffer data. The tile table entries typically contains flags signaling whether the associated pixel block is stored in uncompressed form or in a compressed form in the RAM 50. In the latter case, the flag preferably also signals the size of the compressed block, as different compressed blocks can have different total bit lengths. For example, a 2-bit flag can be used for signaling uncompressed block, compressed with compressed with 50% of original size, compressed with 25% of original size or fast-color-cleared.

A rasterizer or rasterizing unit 20 is connected to the buffer unit 10 and performs the actual rasterization of pixels. The rasterizer 20 is connected to one or multiple pixel pipelines 30 that are employed for computing the depth and color of a pixel. Each pixel pipeline 30 is connected to a depth testing unit 40 responsible for discarding pixels that are occluded, i.e. having a larger depth value, by previously drawn geometry. The order of the pixel pipelines 30 and the depth testing units 40 can be interchanged from what is disclosed in FIG. 16.

Compressor

FIG. 17 is a schematic block diagram of a compressor 100 according to the present invention. The compressor 100 comprises a prediction provider 110 arranged for providing a prediction of a red (first) color component of a pixel in a multi-pixel block to be compressed by the compressor. The prediction provider 110 comprises a difference calculator arranged for calculating a difference between the red color components of two neighboring pixels positioned adjacent to the current pixel but at previous positions in the same pixel column or pixel row in the block. The particular prediction to select for the pixel is then determined at least partly based on this difference.

If the absolute value of the difference or the squared difference is smaller than a predefined threshold value, a prediction calculator 114 of the provider 110 is activated and calculates the color component prediction of the pixel based on a first weighted combination of the red color components of the two neighboring pixels. The prediction calculator 114 preferably determines an average of these two neighboring red color components. The prediction is then calculated from the average, possibly utilizing further color components of pixels in the block, but is preferably equal to the average.

However, if the difference is not smaller than the threshold, a prediction selector 116 of the provider 110 is activated. This prediction selector 116 selects one of a second weighted combination and a third different weighted combination of the red color components of the two neighboring pixels as prediction for the pixel. The prediction selector 116 is preferably also configured for calculating the respective second and third weighted combinations of the red color components.

In a preferred embodiment, the difference calculator 112 calculates, if the difference $R_{(i-1)}-R_{i(j-1)}$ is not smaller than the threshold, a first difference between the second weighted combination of the red color components of the two neighboring pixels and the current pixel and a second difference between the third weighted combination of the red color components of the neighboring pixels and the current pixel. The prediction selector 116 uses these two calculated differences for selecting the prediction of the red color component of the current pixel. Generally, the selector 116 selects the one of the second and third weighted combination that results in the smallest difference, in terms of magnitude, of the first and second differences.

A guiding bit provider 118 is arranged functionally connected to the prediction selector 116. The provider generates a guiding bit representative of the selected prediction direction and the weighted combination selected by the prediction selector 116 as color component predictor.

The compressor 100 also comprises an error calculator 120 for calculating a prediction error for a current pixel based on the red color component of the pixel and the provided prediction from the provider 110. The error is preferably a difference between the (true) color component and the prediction.

A representation determiner 130 processes the calculated prediction error to get an encoded error representation. The resulting compressed block comprises this encoded error representation for the current pixel and a guiding bit if employed, i.e. if the prediction selector 116 and not the prediction calculator 114 provided the color component prediction for the pixel.

The red color component of a pixel has now been compressed by the compressor 110. The procedure is preferably repeated for other pixels in the block. Furthermore, when compressing a green (second) color component of the pixels, a component difference calculator 140 of the compressor 100 is activated. The calculator 140 calculates, for each pixel in the block, a respective difference between the green and red color components of the pixels, $G_{ij}-R_{ij}$.

In such a case, the difference calculator 112 investigates whether, for a given pixel, the difference between the red color components of its two neighboring pixels in predefined prediction directions exceed a threshold. If the difference is smaller than the threshold, the prediction calculator 114 calculates a second prediction for the pixel based on a first weighted combination (preferably employing the same non-zero weights as the first weighted combination of the red color components) of a first difference between the green and red color components of the first neighboring pixel and a second difference between the green and red color components of the second neighboring pixel. In a preferred embodiment, the second prediction is calculated based on, and more preferably equal to, the average of the first and second differences.

If the difference instead exceeds the threshold, the prediction selector 116 selects one of the second and third weighted combinations (preferably employing the same weights as the respective second and third weighted combinations of the red color components) of the first and second differences, $G_{(i-1)j}-R_{(i-1)j}$ or $G_{i(j-1)}-R_{i(j-1)}$, as second prediction for the current pixel. The selector 116 preferably uses the previously determined guiding bit assigned to the pixel for selecting which of these two weighted combinations to use as second prediction. Alternatively, the difference calculator can anew calculate the differences $R_{ij}-WC_2$ and $R_{ij}-WC_3$ and select second prediction based thereon.

The error calculator 120 calculates the prediction error between the color component difference $G_{ij}-R_{ij}$ and the prediction provided by the prediction provider 110. The determiner 130 determines an encoded representation of the calculated prediction error for the second prediction and the result is included in the compressed block.

The component difference calculator 140 preferably also calculates a difference between the blue (third) and green color components $B_{ij}-G_{ij}$ of the pixels in the block. These differences are then processed in a similar way as described above in order to provide a blue color component prediction and third encoded prediction error representation for the pixel.

The units 110 to 140 of the compressor 100 may be provided as software, hardware or a combination thereof. The units 110 to 140 may be implemented together in the compressor 100. Alternatively, a distributed implementation is also possible with some of the units provided elsewhere in the color buffer architecture.

FIG. 18 is a block diagram illustration a preferred implementation of the representation determiner 130 of FIG. 17 in more detail. The determiner 130 comprises an error modifier 132. This modifier 132 processes the calculated prediction error to get a positive prediction error as previously described, i.e. inputting the prediction error x into the function $n(x)=-2x$ for negative prediction errors (and zero value) and into the function $p(x)=2x-1$ for positive ones. The resulting modified prediction error is encoded, preferably by a Golomb-Rice coder 134. This coder 134 outputs the encoded prediction error representation based on an encoding of the positive error from the error modifier 132.

Generally, the coder 134 comprises a value searcher for searching for an exponent value k employed to get a number $2^k$, by which the modified prediction error is divided. The value k is preferably determined for a group of pixels in the block so that these pixels share the same value k. This saves number of bits of the final compressed block representation as compared to having a dedicated value k for each pixel in the block. The value searcher 131 can perform an exhaustive search among all available values k, such as $0 \leq k \leq 15$. The value k leading to the most efficient coding, i.e. shortest compressed block representation is then selected and used for the pixel group. In a less computationally expensive embodiment, the value searcher only performs the search among $p-4 \leq k \leq p$, where p is the bit position of the most significant bit in the largest first color component of the investigated pixel group.

A divider 133 uses the determined value k and divides the prediction errors of the pixels in the current group by the number $2^k$ to get a quotient and a k-bit remainder. A unary coder 135 is provided for unary encoding the quotient according well known procedures. The encoded prediction error representation of a pixel then comprises the unary coded quotient, the remainder and the value k.

The units 132 to 135 of the representation determiner 130 may be provided as software, hardware or a combination thereof. The units 132 to 135 may be implemented together in the representation determiner 130. Alternatively, a distributed implementation is also possible with some of the units provided elsewhere in the compressor.

FIG. 19 is a schematic block diagram illustrating another embodiment of the compressor 100. In addition to the units previously described in connection with FIG. 17, the compressor comprises a start selector 150. The start selector 150 selects a start component value for the block, where this value is equal to the red color component of a selected pixel in the block. This pixel preferably has a predefined pixel position in the block and is preferably the upper left pixel. The compressed block representation comprises a representation of the start component value, preferably as an uncoded bit sequence, i.e. if the start value is a P-bit sequence, the representation included in the compressed block is the same P-bit sequence.

The prediction provider 110 is arranged for providing predictions for pixels present in the same row and column as the start pixel, preferably the first row and column. For these pixels, the respective predictions are selected to be equal to the red color component (in the case of first prediction), the difference between the green and red color components (in the case of second prediction) or the difference between the blue and green color components (in the case of third prediction) of the pixel having the immediate preceding position towards the start pixel in the same row or column as the current pixel.

The compressor 100 preferably also comprises a restart selector 160 for selecting a restart component value. The selector 160 provides the restart value to be equal to the red color component of a selected restart pixel in the block. The identification of the restart pixel can be performed according to an exhaustive search investigating each pixel position except the start pixel. For each candidate restart position, a compressed candidate representation of the block is determined. The candidate restart position resulting in the most efficient compression, i.e. shortest bit sequence of the compressed block, is preferably selected. Furthermore, a compressed candidate representation without operation of the restart selector 160, i.e. without any restart pixel in the block, is preferably also determined and compared for coding efficiency with the candidates having a restart value. In such a case, a restart bit can be included in the compressed block to signal whether the block has any restart pixel or not.

Instead of employing a computationally expensive exhaustive search, the restart selector 160 can identify the pixel in the block having a red color component differing the most from the start component value from the start selector. For each pixel, a first difference between the red color component and the start value, $R_{ij}-R_{start}$, and a second difference between the red color component and the most differing value, $R_{ij}-R_{diff}$, are calculated. If the first difference is the smallest for a pixel, a pixel classifier 170 classifies the pixel as predictive of the start component value. However, if $|R_{ij}-R_{diff}|<|R_{ij}-R_{start}|$, the classifier 170 instead classifies the pixel as predictive of the restart component value.

The restart selector 160 investigates all those pixels regarded as being predictive of the restart value and identifies the restart pixel as the first pixel in traversal order ((1, 1)→(1, 4), (2, 1)→(2, 4), (3, 1)→(3, 4), (4, 1)→(4, 4) in the case of a 4×4 pixel block) that is regarded as being predictive of the restart value. The compressed block representation then preferably comprises a representation of the identified position of the restart pixel and a representation of the restart value, i.e. the red color component value of the identified restart pixel.

A pixel investigator 180 is arranged in the compressor 100 for investigating whether any of the two neighboring pixels at position (i−1,j) and (i,j−1) have the same classification as the current pixel at position (i,j). If none of them have the same classification, there is not any good prediction available for the pixel. The compressor 100 solves this problem through a pixel reorder 190. The reorder unit 190 then reorders the relative positions for the pixels in the block so that at least one new neighboring pixel that the new position (i−1,j) or (i,j−1) preferably has a same classification as the current pixel. The compressed block representation preferably comprises a rotate bit indicating whether any pixel reordering has been performed or not for the current block.

The units 110 to 190 of the compressor 100 may be provided as software, hardware or a combination thereof. The units 110 to 190 may be implemented together in the compressor 100. Alternatively, a distributed implementation is also possible with some of the units provided elsewhere in the color buffer architecture.

Decompressor

FIG. 20 is a block diagram of an embodiment of a decompressor 200 according to the present invention for decompressing a compressed pixel block. The decompressor 200 comprises an error determiner 210 arranged for determining a prediction error of a pixel to be decoded. This prediction error is determined based on an encoded error representation assigned to the pixel and include din the compressed pixel block.

A prediction provider 220 is implemented in the decompressor 200 for providing a prediction of a red color component of the pixel. The provider 220 comprises a difference calculator 222 for calculating a difference between the previously decoded red color components of two neighboring pixels present in the same block row and column as the current pixel. This difference or more preferably the absolute value or squared difference is compared to a predefined threshold. If the difference is smaller than the threshold, a prediction calculator 224 is activated and calculates the prediction based on a first (non-zero) weighted combination of these two neighboring color components. As has been discussed above, the calculation is preferably performed based on an average of the two color components.

However, if the difference exceeds the threshold, a prediction selector 226 selects one of the second and third weighted combinations of the previously decoded color components of the neighboring pixels as prediction. This selection is furthermore performed based on the guiding bit assigned to the pixel and included in the compressed pixel block.

A representation calculator 230 uses the prediction error from the error determiner 210 and the prediction from the provider 220 to calculate the red color component of the pixel.

Correspondingly when decoding a green color component of the pixel the error determiner 210 determines a second error prediction for pixel from data contained in the compressed block. The prediction calculator 224 calculates, if the difference between the red color components of the two neighboring pixels is smaller than the threshold, a second prediction based on the first weighted combination of the differences between the previously decoded green and red color components of the two neighboring pixels as previously described. In the other case, i.e. difference exceed the threshold, the selector 226 uses the guiding bit to select one of the second and third weighted combinations of the differences between the previously decoded green and red color components of the two neighboring pixels as the second prediction.

The representation calculator 230 preferably adds the second prediction error from the determiner 210 to the second prediction from the prediction provider 220. Furthermore, the previously decoded red color component of the pixel is added to the sum to get the decoded green color component. The decompressor 200 repeats this procedure for the blue color component by determining a third prediction error and providing a third prediction. The previously decoded green color component is added to these third error and prediction to get the decoded blue color component of the pixel.

The units 210 to 230 of the decompressor 20Q may be provided as software, hardware or a combination thereof. The units 210 to 230 may be implemented together in the decompressor 200. Alternatively, a distributed implementation is also possible with some of the units provided elsewhere in the color buffer architecture.

FIG. 21 is a schematic block diagram of an embodiment of the error determiner 210. The determiner 210 comprises a Golomb-Rice decoder 212 operating on the encoded prediction error representation in the compressed block. In particular, the decoder 212 uses a unary coded quotient, a k-bit remainder and a value k of a pixel to calculate the prediction error as previously described.

The unit 212 of the error determiner 210 may be provided as software, hardware or a combination thereof. The unit 212 may be implemented together in the error determiner 210. Alternatively, a distributed implementation is also possible with some of the unit provided elsewhere in the decompressor.

FIG. 22 is an illustration of an alternative embodiment of the decompressor 200. In addition to the decompressor units previously described in connection with FIG. 20, the decompressor 200 comprises a start provider 240. This start provider 240 is implemented for providing a red color component of a start pixel in the block. This component is preferably set equal to a start component value comprised in the compressed pixel block.

The prediction provider 220 preferably provides the predictions for pixels in the same row and column as the start pixel by setting the prediction to be equal to the red color component, the difference between the green and red color components and the difference between the blue and green color components of the next previous pixel in the row or column.

A corresponding restart identifier 250 is arranged in the decompressor 200 for determining whether any restart pixel is present in the block. This decision is made based on a restart bit included in the compressed pixel block. If a restart value should be used, the identifier 250 uses a restart position identifier of the compressed block to identify the particular pixel position in the block that is regarded as restart pixel.

A restart provider 260 sets the red color component of the restart pixel to be equal to a restart component value included in the compressed block.

An optional pixel reordering unit 270 is implemented in the decompressor 200 for investigating a reorder bit or word to determine whether any reordering of the pixel positions should be performed once the pixels have been decoded.

The units 210 to 270 of the decompressor 200 may be provided as software, hardware or a combination thereof. The units 210 to 270 may be implemented together in the decompressor 200. Alternatively, a distributed implementation is also possible with some of the units provided elsewhere in the color buffer architecture.

FIG. 23 is a diagram illustrating compression performance for the "Shadow" scene for different resolutions, where 100% represents the original bandwidth. The hatched line corresponds to the depth buffer compression scheme presented by Hasselgren and Akenine-Wöller [2] and the continuous line represents the color buffer compression of the invention. Note how the invention compresses the data to between 45% and 39% of the original size. This means that the bandwidth is reduced by more than 50% for all tested resolutions, which is a significant gain.

The same scene has been used in a number of resolutions in order to test the performance for different sizes of triangles. A low resolution means that the triangles are small in comparison to the pixels, i.e. a "high complexity" type of scene. A high resolution means that the triangles are large in comparison to the pixels, representing a "low complexity" type of scene.

It will be understood by a person skilled in the art that various modifications and changes may be made to the present invention without departure from the scope thereof, which is defined by the appended claims.

REFERENCES

[1] Rasmusson, Hasselgren and Akenine-Möller, "Exact and Error-bounded Approximate Color Buffer Compression and Decompression", Graphics Hardware, 2007, pp. 41-48
[2] Haselgren and Akenine-Möller, "Efficient Depth Buffer Compression", Graphics Hardware, 2006, pp. 103-110

What is claimed is:

1. A method of compressing a block of multiple pixels into a compressed block representation, each pixel comprising a first color component and a second color component, said method comprising:
calculating a first prediction of a first color component of a pixel in the block of multiple pixels based on a weighted combination of a first color component of a first and a second neighboring pixel, the first and second neighboring pixel being immediately adjacent to the pixel whose first prediction is currently being calculated;
deriving a first prediction error based on the first prediction and the first color component of the pixel;
calculating a second prediction of a second color component of the pixel based on a weighted combination of a first difference between the first and second color component of the first neighboring pixel and a second difference between the first and second color component of the second neighboring pixel;
deriving a second prediction error based on the second prediction and the second color component of the pixel;
encoding the first prediction error and the second prediction error; and
including in the compressed block representation the encoded first prediction error and the encoded second prediction error as respective representations of the first and second color component of the pixel.

2. The method of claim 1, wherein the calculating of a first prediction of a first color component of a pixel based on a weighted combination of the first color component of the two neighboring pixels comprises:
calculating a magnitude difference between the first color component of the two neighboring pixels;
comparing the magnitude difference with a threshold;
selecting a first weighted combination of the first color component of the two neighboring pixels if the magnitude difference is smaller than the threshold; and
selecting between a second weighted combination or a third weighted combination of the first color components of the two neighboring pixels if the magnitude difference is not smaller than the threshold, and providing a guiding bit to indicate which of the second or third weighted combination is selected,
wherein the guiding bit is encoded into the compressed block representation.

3. The method of claim 2, wherein the calculating of a second prediction of a second color component of the pixel based on a weighted combination of two differences between the second and first color component of the two neighboring pixels respectively comprising:
selecting a first weighted combination of the two differences between the second and first color component of the two neighboring pixels if the magnitude difference of the first color component of the two neighboring pixels is smaller than a threshold; and
selecting between a second weighted combination or a third weighted combination of the two differences if the magnitude difference is not smaller than the threshold.

4. The method of claim 3, wherein weights used in the first weighted combination of the first color components of the two neighboring pixels are the same as weights used in the first weighted combination of the two differences between the second and first color component of the two neighboring pixels.

5. The method of claim 2, wherein the first weighted combination of the first color component of the two neighboring pixels is calculated based on an average of the first color components of the two neighboring pixels.

6. The method of claim 2, wherein the selecting between a second weighted combination or a third weighted combination if the magnitude difference is not smaller than the threshold comprises:
- calculating a first difference between said second weighted combination and said first color component of said at least one pixel;
- calculating a second difference between said third weighted combination and said first color component of said at least one pixel; and
- selecting said first prediction based on said first difference and said second difference.

7. A method of decompressing a compressed pixel block for a block of multiple pixels, said method comprising:
- determining, for at least one pixel of said compressed pixel block, a first prediction error based on a first encoded error representation associated with said at least one pixel and comprised in said compressed pixel block;
- determining, for said at least one pixel, a second prediction error based on a second encoded representation composed in said compressed pixel block;
- determining whether an optional guiding bit is associated with said at least one pixel and if so, retrieving the optional guiding bit from the compressed pixel block;
- providing a first prediction of a first color component of said at least one pixel of said block of multiple pixels based on a weighted combination of a first color component of a first neighboring pixel and a first color component of a second neighboring pixel and the optional guiding bit, the first and second neighboring pixel being immediately adjacent to said at least one pixel;
- providing a second prediction of a second color component of said at least one pixel based on a weighted combination of a first difference between the first and second color component of the first neighboring pixel and a second difference between the first and second color component of the second neighboring pixel;
- calculating a representation of said first color component of said at least one pixel based on said first prediction error and said first prediction; and
- calculating a representation of said second color component of said at least one pixel based on said second prediction error and said second prediction.

8. The method of claim 7, wherein the providing of a first prediction of a first color component of said at least one pixel based on a weighted combination of a first color component of a first neighboring pixel and a first color component of a second neighboring pixel and the optional guiding bit comprises:
- calculating a magnitude difference between the first color component of the two neighboring pixels;
- comparing the magnitude difference with a threshold;
- selecting a first weighted combination of the first color component of the two neighboring pixels if the magnitude difference is smaller than the threshold; and
- selecting between a second weighted combination or a third weighted combination of the first color components of the two neighboring pixels based on the optional guiding bit if the magnitude difference is not smaller than the threshold.

9. The method of claim 7, wherein the providing of a second prediction of a second color component of said at least one pixel comprises:
- selecting a first weighted combination of the two differences between the second and first color component of the two neighboring pixels if the magnitude difference of the first color component of the two neighboring pixels is smaller than a threshold; and
- selecting between a second weighted combination or a third weighted combination of the two differences if the magnitude difference is not smaller than the threshold.

10. A block compressor for compressing a block of multiple pixels into a compressed block representation, each pixel compromising a respective color having a first color component and a second color component, said block compressor comprising:
- a first prediction calculator circuit configured to calculate a first prediction of a first color component of a pixel in the block of multiple pixels based on a weighted combination of a first color component of a first neighboring pixel and a second neighboring pixel, the first and second neighboring pixel being immediately adjacent to the pixel whose first prediction is currently being calculated;
- a first prediction error calculator circuit configured to derive a first prediction error based on the first prediction and the first color component of the pixel;
- a second prediction calculator circuit configured to calculate a second prediction of a second color component of the pixel based on a weighted combination of a first difference between the first and second color component of the first neighboring pixel and a second difference between the first and second color component of the second neighboring pixel;
- a second prediction error calculator circuit configured to derive a second prediction error based on the second prediction and the second color component of the pixel;
- an encoder circuit configured to encode the first predictor error and the second prediction error into the compressed block representation as respective representations of the first and second color component of the pixel.

11. The block compressor of claim 10, wherein the first prediction calculator circuit is further configured to:
- calculate a magnitude difference between the first color component of the two neighboring pixels;
- compare the magnitude difference with a threshold;
- select a first weighted combination of the first color component of the two neighboring pixels if the magnitude difference is smaller than the threshold; and
- select between a second weighted combination or a third weighted combination of the first color components of the two neighboring pixels if the magnitude difference is not smaller than the threshold, and providing a guiding bit to indicate which of the second or third weighted combination is selected,
- wherein the block compressor is further configured to include the guiding bit in the compressed block representation.

12. The block compressor of claim 10, wherein the second prediction calculator circuit is further configured to:
- select a first weighted combination of the two differences between the second and first color component of the two neighboring pixels if the magnitude difference of the first color component of the two neighboring pixels is smaller than a threshold; and select between a second weighted combination or a third weighted combination of the two differences if the magnitude difference is not smaller than the threshold.

13. A block decompressor for decompressing a compressed pixel block for a block of multiple pixels, said block decompressor comprising:
a first prediction error obtainer circuit for determining, for at least one pixel of said compressed pixel block, a first predictor error based on a first encoded error representation associated with said at least one pixel and comprised in said compressed pixel block;
a second prediction error obtainer circuit for determining, for said at least one pixel, a second prediction error based on a second encoded representation composed in said compressed pixel block;
a guiding bit obtainer circuit for determining whether an optional guiding bit is associated with said at least one pixel and if so, retrieving the optional guiding bit from the compressed pixel block;
a first prediction generator circuit for providing a first prediction of a first color component of said at least one pixel of said block of multiple pixels based on a weighted combination of a first color component of a first neighboring pixel and a first color component of a second neighboring pixel and the optional guiding bit, the first and second neighboring pixel being immediately adjacent to said at least one pixel;
a second prediction generator circuit for providing a second prediction of a second color component of said at least one pixel based on a weighted combination of a first difference between the first and second color component of the first neighboring pixel and a second difference between the first and second color component of the second neighboring pixel;
a color representation calculator circuit configured to:
calculate a representation of said first color component of said at least one pixel based on said first prediction error and said first prediction; and
calculate a representation of said second color component of said at least one pixel based on said second color prediction error and said second prediction.

14. The block decompressor of claim 13, wherein the first prediction generator circuit is further configured to:
calculate a magnitude difference between the first color component of the two neighboring pixels;
compare the magnitude difference with a threshold;
select a first weighted combination of the first color component of the two neighboring pixels if the magnitude difference is smaller than the threshold; and
select between a second weighted combination or a third weighted combination of the first color components of the two neighboring pixels based on the optional guiding bit if the magnitude difference is not smaller than the threshold.

15. The block decompressor of claim 13, wherein the second prediction generator circuit is further configured to:
select a first weighted combination of the two differences between the second and first color component of the two neighboring pixels if the magnitude difference of the first color component of the two neighboring pixels is smaller than a threshold; and
select between a second weighted combination or a third weighted combination of the two differences if the magnitude difference is not smaller than the threshold.

* * * * *

UNITED STATES PATENT AND TRADEMARK OFFICE
CERTIFICATE OF CORRECTION

PATENT NO.        : 8,824,790 B2                          Page 1 of 2
APPLICATION NO.   : 13/619127
DATED             : September 2, 2014
INVENTOR(S)       : Ström et al.

It is certified that error appears in the above-identified patent and that said Letters Patent is hereby corrected as shown below:

On the Title Page, item (75), under "Inventors", in Column 1, Line 2, delete "Arsta" and insert -- Årsta --, therefor.

In the Drawings

In Fig. 9, Sheet 4 of 13, in Step "S53", in Line 2, delete "QOUTIENT" and insert -- QUOTIENT --, therefor.

In the Specifications

In Column 7, Line 1, delete "floating point" and insert -- floating-point --, therefor.

In Column 8, Line 41, delete "$_{i1}=R_{(j-1)l}$," and insert -- $_{i1}=R_{(i-1)1}$, --, therefor.

In Column 12, Line 1, delete "Golumb-Rice" and insert -- Golomb-Rice --, therefor.

In Column 12, Line 40, delete "Golumb-Rice" and insert -- Golomb-Rice --, therefor.

In Column 15, Line 10, delete "$\tilde{R}_{11}=R_{11}-\hat{R}_{11}-R_{(i-1)1}.$" and insert -- $\tilde{R}_{i1}=R_{i1}-\hat{R}_{i1}-R_{(i-1)1}.$ --, therefor.

In Column 15, Lines 29, delete "w$_{(i-1)}$)" and insert -- w$_{(i-1)}$ --, therefor.

In Column 23, Line 29, delete "compressor 110." and insert -- compressor 100. --, therefor.

In Column 23, Line 54, delete "G$_{(i-1)}$-" and insert -- G$_{(i-1)j}$- --, therefor.

In Column 26, Line 11, delete "include din" and insert -- included in --, therefor.

Signed and Sealed this
Fifth Day of July, 2016

Michelle K. Lee
*Director of the United States Patent and Trademark Office*

CERTIFICATE OF CORRECTION (continued)
U.S. Pat. No. 8,824,790 B2

In Column 26, Line 60, delete "20Q" and insert -- 200 --, therefor.

In Column 27, Line 51, delete "Akenine-Wöller" and insert -- Akenine-Möller --, therefor.

In Column 28, Line 8, delete "103-110" and insert -- 103-110. --, therefor.